(12) United States Patent
Wigren

(10) Patent No.: US 9,888,398 B2
(45) Date of Patent: Feb. 6, 2018

(54) INTERFERENCE ESTIMATION AND DEVICES THEREFORE

(71) Applicant: Telefonaktiebolaget L M Ericsson (publ), Stockholm (SE)

(72) Inventor: Torbjörn Wigren, Uppsala (SE)

(73) Assignee: Telefonaktiebolaget LM Ericsson (publ) (SE)

( * ) Notice: Subject to any disclaimer, the term of this patent is extended or adjusted under 35 U.S.C. 154(b) by 213 days.

(21) Appl. No.: 14/779,158

(22) PCT Filed: Nov. 18, 2013

(86) PCT No.: PCT/SE2013/051351
§ 371 (c)(1),
(2) Date: Sep. 22, 2015

(87) PCT Pub. No.: WO2014/148965
PCT Pub. Date: Sep. 25, 2014

(65) Prior Publication Data
US 2016/0057641 A1    Feb. 25, 2016

Related U.S. Application Data

(60) Provisional application No. 61/804,328, filed on Mar. 22, 2013.

(51) Int. Cl.
*H04B 7/216* (2006.01)
*H04B 1/04* (2006.01)
(Continued)

(52) U.S. Cl.
CPC .......... *H04W 24/08* (2013.01); *H04B 1/1027* (2013.01); *H04B 1/7103* (2013.01);
(Continued)

(58) Field of Classification Search
CPC .......... H04B 17/0075; H04B 17/0077; H04B 15/00; H04W 24/02; H04W 24/10;
(Continued)

(56) References Cited

U.S. PATENT DOCUMENTS 7,912,461 B2    3/2011   Wigren
7,953,025 B2 *  5/2011   Wigren ............... H04W 52/343
                                                   370/252

(Continued)

FOREIGN PATENT DOCUMENTS

WO    2007024166 A1    3/2007
WO    2013043093 A1    3/2013
WO    2013170465 A1    11/2013

OTHER PUBLICATIONS

Siomina, Iana et al., "Analysis of Cell Load Coupling for LTE Network Planning and Optimization", IEEE Transactions on Wireless Communications, vol. 11, No. 6, Jun. 2012, 2284-2297.
(Continued)

*Primary Examiner* — Hanh N Nguyen
(74) *Attorney, Agent, or Firm* — Murphy, Bilak & Homiller, PLLC

(57) ABSTRACT

A method for neighbor cell interference estimation in the UpLink of a CDMA communication system comprises obtaining measurements of an uplink received total wideband power (RTWP) and obtaining measurements of a load utilization of the uplink. At least a sum of the neighbor cell interference power and the noise power floor as well as a load utilization probability are jointly estimated from the measurements of an uplink RTWP and the measurements of a load utilization of the uplink. A thermal noise power floor is monitored by performing a running estimate of a long-time average uplink wideband power, preferably an estimated thermal noise power floor level or an operational level of the RTWP. A subset of the states of the estimation is
(Continued)

selected, comprising only all states of the estimation that are associated with powers. The states of the selected subset and quantities associated therewith are scaled with a scaling factor. The scaling factor depends on the running estimate.

33 Claims, 13 Drawing Sheets

(51) Int. Cl.
*H04W 24/08* (2009.01)
*H04B 17/345* (2015.01)
*H04B 1/10* (2006.01)
*H04J 11/00* (2006.01)
*H04B 1/7103* (2011.01)
*H04L 5/00* (2006.01)

(52) U.S. Cl.
CPC ......... *H04B 17/345* (2015.01); *H04J 11/005* (2013.01); *H04L 5/0073* (2013.01)

(58) Field of Classification Search
CPC . H04W 52/365; H04W 24/08; H04W 52/343; H04W 28/08; H04L 12/26; H04L 43/0876; H04L 5/0073
See application file for complete search history.

(56) References Cited

U.S. PATENT DOCUMENTS

| | | | |
|---|---|---|---|
| 7,983,187 B2* | 7/2011 | Wigren | H04W 52/343 370/252 |
| 8,005,433 B2* | 8/2011 | Wigren | H04B 1/7097 455/63.1 |
| 8,982,701 B2* | 3/2015 | Wigren | H04B 17/0042 370/235 |
| 9,020,548 B2* | 4/2015 | Wigren | 455/452.2 |
| 9,578,535 B2* | 2/2017 | Wigren | H04B 15/00 |
| 2012/0147828 A1* | 6/2012 | Wigren | H04W 72/1268 370/329 |

OTHER PUBLICATIONS

Wigren, T et al., "Estimation of uplink WCDMA load in a single RBS", IEEE 66th Vehicular Technology Conference 2007, Sep. 30-Oct. 3, 2007, Baltimore, MD, USA, 1499-1503.
Wigren, T., "Low Complexity Kalman Filtering for Inter-Cell Interference and Power Based Load Estimation in the WCDMA Uplink", International Conference on Signal Processing and Communication Systems, Dec. 14, 2011, 1-10.
Wigren, T., "Soft Uplink Load Estimation in WCDMA", IEEE Transactions on Vehicular Technology, vol. 58, No. 2, Feb. 2009, 760-772.
Wigren, Torbjörn, "Recurvise Noise Floor Estimation in WCDMA", IEEE Transactions on Vehicular Technology, vol. 59, No. 3, Jun. 2010, 1-6.

* cited by examiner

INTERFERENCE ESTIMATION AND DEVICES THEREFORE

TECHNICAL FIELD

The present disclosure relates in general to interference estimation procedures and devices therefore, and in particular to interference estimation procedures and devices in Code Division Multiple Access (CDMA) communication systems.

BACKGROUND

In connection with CDMA communication systems and Wideband CDMA (WCDMA) communication systems, Heterogeneous Networks (HetNets) have recently been discussed and developed intensively. Heterogeneous networks concerns effects associated with networks where different kinds of cells are mixed. A problem is then that these cells may have different radio properties in terms of e.g. radio sensitivity, frequency band, coverage, output power, capacity or acceptable load level. This can be an effect of the use of different RBS sizes (macro, micro, pico, femto), different revision (different receiver technology, SW quality), different vendors and of the purpose of a specific deployment.

One of the most important factor in HetNets is that of air interface load management, i.e. the issues associated with the scheduling of radio resources in different cells and the interaction between cells in terms of inter-cell interference. The aspects that are of interest for the present disclosure are the algorithmic architectures associated with such air-interface load management in the UpLink (UL) of e.g. the WCDMA system. The reason for this renewed interest includes the need to optimize performance in HetNets and the fact that the concept of load changes with the introduction of advanced receivers.

To exemplify these problems, consider FIG. 1. That figure shows a Het Net 1 comprising a number of high power cells 2, also denoted as macro cells. A low power cell 4 with limited coverage is intended to serve a hotspot 3. In order to get a sufficient coverage of the hotspot 3 an interference suppressing receiver may be used. The problem is now that the low power cell is located in the interior of and at the boundary of a specific macro cell. Further, surrounding macro cells interfere with the low power cell rendering a high level of neighbor cell interference in the low power cell, that despite the advanced receiver reduces the coverage to levels indicated by reference numeral 5 that do not allow a major coverage of the hotspot 3. As a result, users of the hotspot 3 are connected to the surrounding macro cells 2, thereby further increasing the neighbor cell interference experienced by the low power cell 4.

From this discussion it should be clear that it would be advantageous if the Radio Network Controller (RNC) or the surrounding Radio Base Stations (RBSs) could be informed of the interference situation and take action, using e.g. admission control in the RNC or new functionality in the surrounding RBSs to reduce neighbor cell interference and to provide a better management of the hot spot traffic—in terms of air interface load. This requires RBS means to estimate the neighbor cell interference. This requires careful consideration of the algorithmic architectures involved.

Load estimation and load prediction as concepts are well know in prior art. Some of the applied methods are summarized in Appendix A.

Neighbor cell interference estimation as such based on uplink power measurements is known in prior art and it is e.g. described in [2]. The technology is based on the assumption that the powers of all radio links are measured in the uplink receiver. This is not the case today. The power measurement is associated with difficulties since the transmission of the WCDMA uplink is not orthogonal, a fact that causes errors when the powers are estimated and since the individual code powers are often small, making signal to noise ratios low as well. This fact contributes to the inaccuracy of said power estimates.

The major problem associated with the solution of [2], [4] is however that the sum of neighbor cell interference and thermal noise power needs to be estimated by means of high order Kalman filtering. This step has a very high computational complexity. Although [5] provides techniques that reduce this computational complexity it is still high when the number of users increase. The subsequent steps of [2] and [4] estimate the thermal noise power floor according to the prior art algorithms described above, followed by a subtraction to arrive at the neighbor cell interference.

The reference [3] recognizes a problem associated with power scaling of the output of the Kalman filter of the Rise over Thermal (RoT) estimator, i.e. the first block 301 of FIG. 2. Essentially, the problem is due to the fact that the Kalman filter is designed at a specific operating point in the linear power domain. Now, with recent traffic increases, the power operating point will vary significantly. With such significantly varying power operating point, the linear power domain of the Kalman filter makes the calculations non-optimized. Furthermore, these problems become even more severe when in-band interference external to the WCDMA system is entered into the equation. This is because such interference affects the UL power level significantly.

A problem is thus that inter-cell interference power estimation algorithms do not include functionality to handle noise floor and interference power variations anticipated in tomorrow's HetNets in an accurate manner.

SUMMARY

An object of the present disclosure is to achieve inter-cell interference power estimation algorithms that are robust in view of significant changes of the noise floor.

In a first aspect, a method for neighbor cell interference estimation in an UpLink of a CDMA communication system comprises obtaining measurements of an uplink received total wideband power (RTWP) and obtaining measurements of a load utilization of the uplink. Preferably, obtaining of measurements of an uplink RTWP comprises the measuring of the uplink RTWP. Preferably, the obtaining measurements of a load utilization of the uplink comprises measuring of the load utilization by comparing a scheduled own load with the used own load. If the communication system is a WCDMA communication system, the used own load is preferably obtained by decoding the Transport Format Combination Indicator (TFCI). A load utilization probability as well as at least a sum of a neighbor cell interference power and the noise power floor are jointly estimated from the measurements of an uplink RTWP and the measurements of a load utilization of the uplink. The estimation is preferably a Bayesian estimation resulting in prediction of states representing the at least a sum of the neighbor cell interference power and the noise power floor as well as the load utilization probability. Preferably, the estimation comprises an extended Kalman filter (EKF). A thermal noise power floor is monitored by performing a running estimate of a long-time average uplink wideband power, preferably an estimated thermal noise power floor level or an operational level of the RTWP. The running estimate has a very long time constant, typically more than $10^5$ times the transmission time interval (TTI). Typical time constants are above 1 hour and preferably at least 12 hours. A subset of the states of the estimation is selected, comprising only all states of the estimation that are associated with powers. The states of the selected subset and quantities associated therewith are scaled with a scaling factor. The scaling factor depends on the running estimate, preferably with a linear dependency. Most preferably, the scaling factor is a ratio between the monitored running estimate and a nominal value of the average uplink wideband power. Preferably, estimated sum of the neighbor cell interference power and the noise power floor is subtracted by an estimated noise power floor providing an estimation of the neighbor cell interference power. The scaled states are utilized in the procedure of jointly estimation.

In a second aspect, a baseband subsystem of a CDMA communication system comprises a neighbor cell interference estimator. The baseband system is preferably comprised in a Node B. The Node B preferably also comprises a power meter connected to the baseband subsystem and operable to measure an uplink RTWP whereby the input is operable to receive the measurements of the uplink RTWP from the power meter. The Node B preferably also comprises a load utilization meter connected to the baseband subsystem and operable to provide measurements of a load utilization of the uplink, preferably by comparing a scheduled own load with the used own load. The input is thereby operable to receive the measurements of the load utilization of the uplink from the load utilization meter. In a WCDMA communication system, the scheduled own load is preferably achieved from an own scheduler and the used own load is obtained by decoding the TFCI in a TFCI decoder. The neighbor cell interference estimator comprises an input for receiving measurements of an uplink RTWP, preferably from the power meter, and for receiving measurements of a load utilization of the uplink, preferably from the load utilization meter. The neighbor cell interference estimator further comprises an estimator section in turn comprising a joint estimator configured for performing a joint estimation of at least a sum of a neighbor cell interference power and the noise power floor as well as of a load utilization probability. Preferably, the estimator section also comprises a subtraction unit, configured for subtracting an estimate of a noise power floor from the estimate of the sum of the neighbor cell interference power and the noise power floor. The estimation is preferably a Bayesian estimation resulting in prediction of states representing the at least a sum of the neighbor cell interference power and the noise power floor as well as the load utilization probability. Preferably, the joint estimator comprises an EKF. The neighbor cell interference estimator further comprises a scaler section, comprising a power monitor and a scaling unit. The scaler section is connected between the input and the estimator section. The power monitor is configured for monitoring a thermal noise power floor by performing a running estimate of a long-time average uplink wideband power, preferably an estimated thermal noise power floor level or an operational level of the RTWP. The running estimate has a very long time constant, typically more than $10^5$ times the TTI. Typical time constants are above 1 hour and preferably at least 12 hours. The scaling unit is operable to select a subset of the states of the estimation, comprising only all states of the estimation that are associated with powers. The scaling unit is further configured to scale the states of the selected subset and quantities associated therewith with a scaling factor. The scaling factor depends on the running estimate, preferably with a linear dependency. Most preferably, the scaling factor is a ratio between the monitored running estimate and a nominal value of the average uplink wideband power. Scaled quantities associated with power are thereby provided from the scaler section to the estimator section. The neighbor cell interference estimator is preferably implemented by software routines in a processor.

In a third aspect, a Node B in a code division multiple access communication system comprises a baseband subsystem according to the second aspect.

In a fourth aspect, a code division multiple access communication system comprises a Node B according to the third aspect.

In a fifth aspect, a baseband subsystem in a code division multiple access communication system comprises an input, a processor and a memory comprising instructions executable by the processor. The baseband subsystem is operative to obtain measurements of an uplink received total wideband power and to obtain measurements of a load utilization of the uplink. The baseband subsystem is further operative to jointly estimate at least a sum of a neighbor cell interference power and a noise power floor as well as a load utilization probability from the measurements of an uplink received total wideband power and the measurements of a load utilization of the uplink. The baseband subsystem is further operative to monitor a thermal noise power floor performing a running estimate of a long-time average uplink wideband power. The baseband subsystem is further operative to select a subset of states of the estimation, comprising only all states of the estimation that are associated with powers, and to scale states of satheid selected subset of states and quantities associated therewith with a scaling factor. The scaling factor is dependent on the running estimate. Thereby, the scaled states are utilizable for performing the jointly estimating.

In a sixth aspect, a baseband subsystem in a code division multiple access communication system comprises a first obtaining module for obtaining measurements of an uplink received total wideband power and a second obtaining module for obtaining measurements of a load utilization of the uplink. The baseband subsystem further comprises an estimating module for jointly estimating at least a sum of a neighbor cell interference power and a noise power floor, as well as a load utilization probability from the measurements of an uplink received total wideband power and the measurements of a load utilization of the uplink. The baseband subsystem further comprises a monitoring module for monitoring a thermal noise power floor performing a running estimate of a long-time average uplink wideband power. The baseband subsystem further comprises a selecting module for selecting a subset of states of the estimation, comprising only all states of the estimation that are associated with powers, and a scaling module for scaling states of the selected subset of states and quantities associated therewith with a scaling factor. The scaling factor is dependent on the running estimate. Thereby, the scaled states are utilizable for performing the jointly estimating.

In a seventh aspect, a computer program, residing in a memory, comprises program code, which when executed by a processing circuitry causes the processing circuitry to obtain measurements of an uplink received total wideband power and to obtain measurements of a load utilization of the uplink. The processing circuitry is further caused to jointly estimate at least a sum of a neighbor cell interference power and a noise power floor, as well as a load utilization probability from the measurements of an uplink received total wideband power and the measurements of a load utilization of the uplink. The processing circuitry is further caused to monitor a thermal noise power floor performing a running estimate of a long-time average uplink wideband power. The processing circuitry is further caused to select a subset of states of the estimation, comprising only all states of the estimation that are associated with powers, and to scale states of the selected subset of states and quantities associated therewith with a scaling factor. The scaling factor is dependent on the running estimate. Thereby, the scaled states are utilizable for performing the jointly estimating.

In an eighth aspect, a computer program product comprises a computer-readable medium on which a computer program is stored. The computer program comprises program code, which when executed by a processing circuitry causes the processing circuitry to obtain measurements of an uplink received total wideband power and to obtain measurements of a load utilization of the uplink. The processing circuitry is further caused to jointly estimate at least a sum of a neighbor cell interference power and a noise power floor, as well as a load utilization probability from the measurements of an uplink received total wideband power and the measurements of a load utilization of the uplink. The processing circuitry is further caused to monitor a thermal noise power floor performing a running estimate of a long-time average uplink wideband power. The processing circuitry is further caused to select a subset of states of the estimation, comprising only all states of the estimation that are associated with powers, and to scale states of the selected subset of states and quantities associated therewith with a scaling factor. The scaling factor is dependent on the running estimate. Thereby, the scaled states are utilizable for performing the jointly estimating.

One advantage of the present ideas is the provision of a new neighbor cell interference estimation algorithm with high bandwidth and high accuracy that automatically adapts to average long term power changes, e.g. caused by in-band non-WCDMA interferers or so-called desensitization functionality in low power radio base stations. Thereby robustness and automatic operation is provided also in regions with in-band interference impairments, allowing for enhanced interference management in HetNets, enhanced capacity in WCDMA networks and reduced operator expenses during field operation.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the drawings, the same reference numbers are used for similar or corresponding elements.

As used herein, the term "wireless device" may refer to a User Equipment, UE, a mobile phone, a cellular phone, a Personal Digital Assistant, PDA, equipped with radio communication capabilities, a smart phone, a laptop or Personal Computer, PC, equipped with an internal or external mobile broadband modem, a tablet PC with radio communication capabilities, a portable electronic radio communication device, a sensor device equipped with radio communication capabilities or the like. In particular, the term "UE" should be interpreted as a non-limiting term comprising any device equipped with radio circuitry for wireless communication according to any relevant communication standard.

As used herein, the term "radio network node" or simply "network node" may refer to base stations, network control nodes, and the like. In particular, the term "base station" may encompass different types of radio base stations including standardized base stations such as Node Bs, or evolved Node Bs, eNBs, and also macro/micro/pico radio base stations, home base stations, also known as femto base stations, relay nodes, repeaters, radio access points, and even radio control nodes controlling one or more Remote Radio Units, RRUs, or the like.

Figure 5:
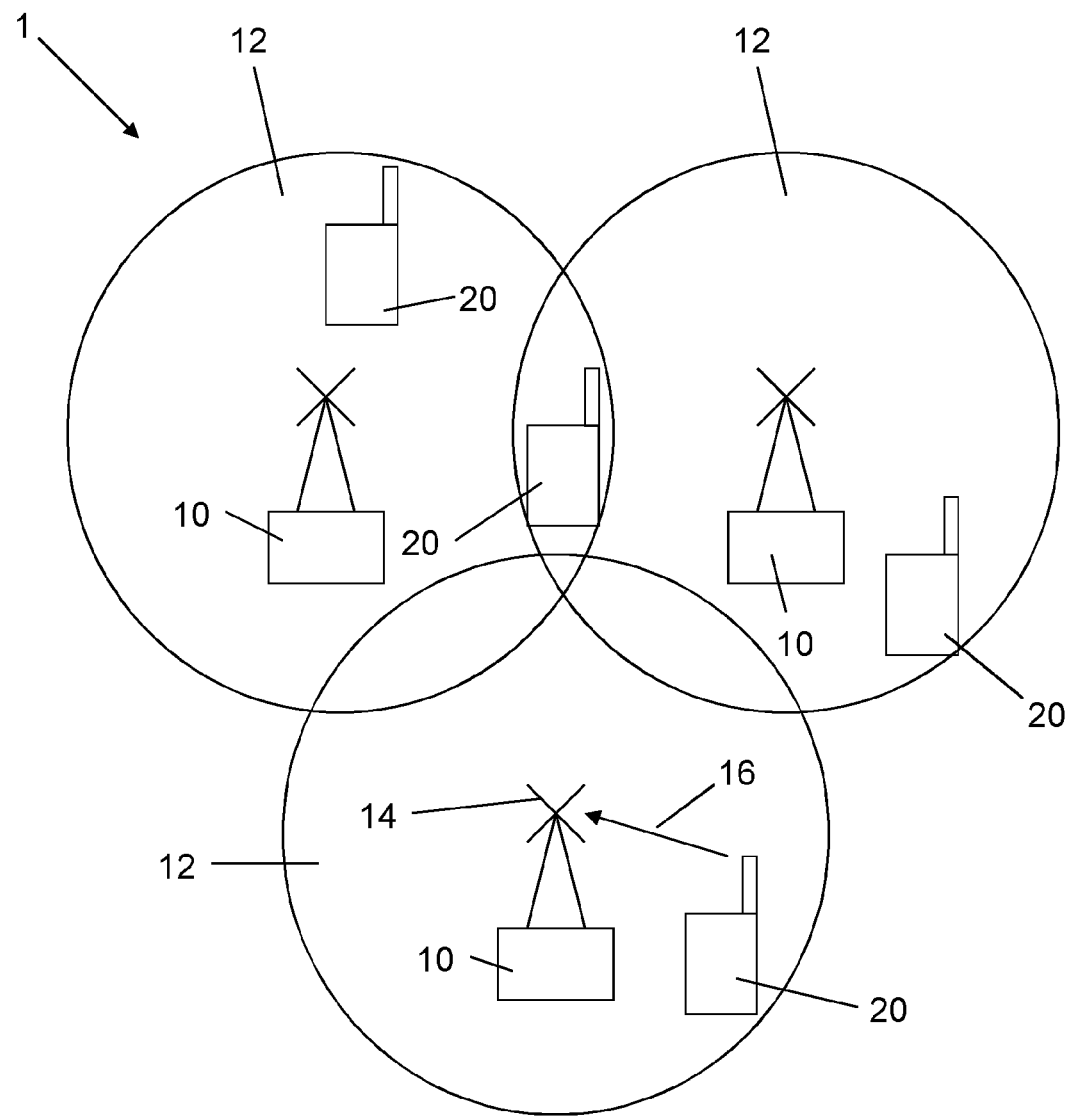
FIG. 5 illustrates schematically a CDMA communication system.

The present ideas concern the uplink signaling in CDMA communication systems, and in particular in WCDMA-systems. FIG. 5 illustrates a CDMA communication system 1 having a number of Node Bs 10, also referred to as Radio Base Stations (RBSs), connected to an antenna 14. With each Node B, a cell 12 is associated. User Equipments (UEs) 20 are present within the area covered by the CDMA communication system 1 and communicated with a respective Node B by uplink signals 16.

Recently, interference in WCDMA networks has been increasing to levels unheard of before. At the same time, cellular networks are becoming more heterogeneous, with macro RBSs being supported by micro and pico RBSs at traffic hot spots. Furthermore, WCDMA home base stations (femto RBSs) are emerging in many networks. These developments put increasing demands on inter-cell interference management. Unfortunately, the consequence of the above is a large increase of the number of network nodes in cellular networks, together with reduced operator control. One particular problem and consequence of the above changes is caused by the much more varying background interference, experienced by base stations as an increased thermal noise level. This background disturbance can e.g. result from in band interference from mobiles of other cellular networks (poor frequency planning), illegal radio equipment, distant radar transmitters, or distant TV transmitters, to mention a few. This causes additional problems for interference estimation algorithms in general and inter-cell interference estimation algorithms in particular.

Background disturbances may also be intentional. A low power node may use a desensitized uplink radio receiver, in order to obtain a balanced uplink/downlink coverage.

Unfortunately, there are no prior art methods available that can cope with increases of the experienced noise floor power. Rather, such increases results in malfunctions of even the most modern algorithms (actually not yet public). In particular the following problems exist. There is currently no practical neighbor cell interference estimation algorithm available that at the same time provides neighbor cell interference estimates with an inaccuracy better than 10-20%, and does so with close to TTI bandwidth, over the interesting power and load ranges and accounts for a high bandwidth measured load utilization probability. This is needed since WCDMA UEs may or may not utilize the power granted by the enhanced uplink (EUL) scheduler. There is currently no practical neighbor cell interference estimation algorithm available that also automatically (without re-tuning) handles large and relatively long term average power changes of the order of 10 dBs or more. The consequence of the above lack of technology is that it is no longer possible to make optimal scheduling decisions in networks where in-band non-WCDMA interference appears. Furthermore, it is no longer possible to manage interference in such heterogeneous networks (HetNets) in an optimal way.

Figure 1:
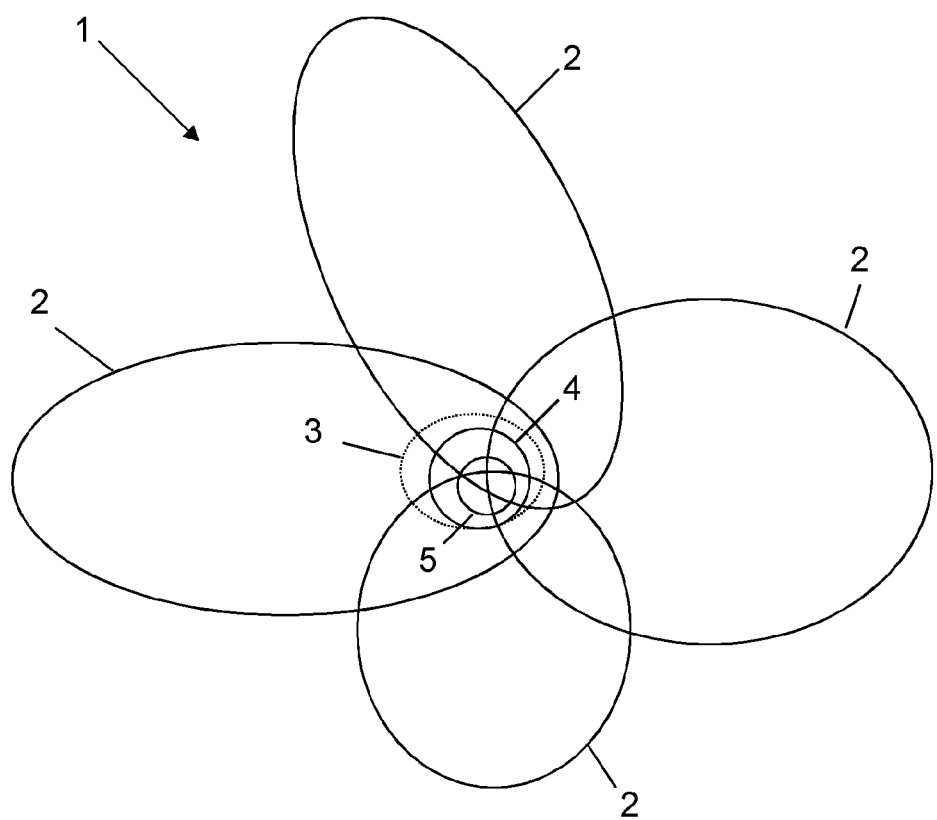
FIG. 1 is an illustration of a HetNet load management problem in WCDMA.
Figure 2:
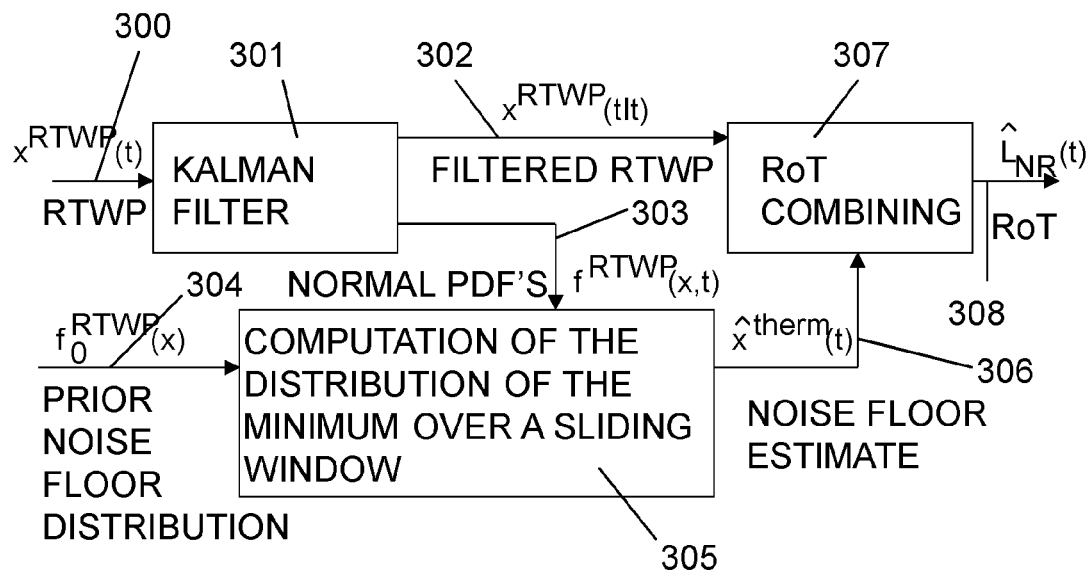
FIG. 2 is a block diagram of a baseline RoT estimation algorithm.

Noting again that the Kalman filter estimation block 301 of FIG. 2 operates in the linear power domain, it follows that this filter will necessarily be tuned for a specific power operating point close to the expected noise power floor. This means that the width of the support of the distributions (the "Gauss-curves") that are estimated remain invariant to large power level changes. In case the actual measured power is far lower or far higher than the nominal operating point a reduced accuracy therefore results for the thermal noise power floor estimator, since estimation is performed on a discrete logarithmic power grid. The details on this prior art discretized estimation technique can be found in [3]

Figure 3:
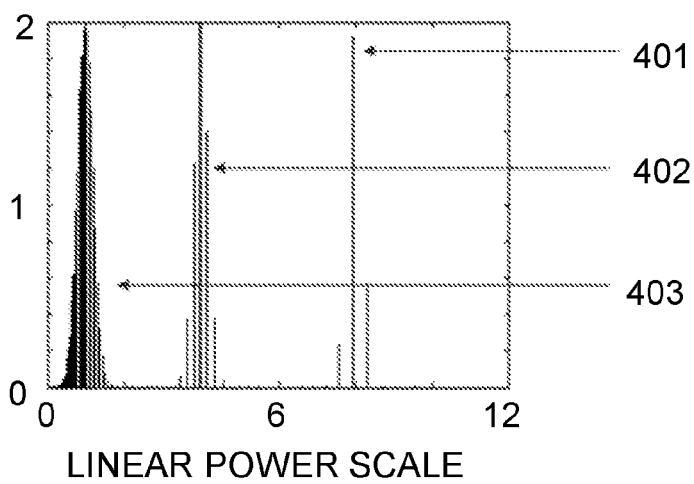
FIG. 3 illustrates the mismatch between the logarithmic power grid and the Kalman filter power estimates.

The power level dependency can be explained from FIG. 3. At nominal power levels, denoted as 402, a sufficient but limited number of grid points is available, and the estimation operates well. At high powers significantly higher than the nominal noise floor, denoted by 401, too few grid points are provided. This leads to a reduced resolution which eventually results in quantization errors. For powers significantly lower than the nominal noise floor, denoted by 403, too many grid points are present, which leads to an unnecessary complexity and a bias. Hence in both cases 401, and 403, the accuracy is reduced. In order to solve the above problems, a power scaling of the following Kalman filter is introduced:

$$K_f(t)=P(t|t-T)C^T(t)(C)P(t|t-T)C^T(t)+R_2(t))^{-1}$$

$$\hat{x}(t|t)=\hat{x}(t|t-T)+K_f(t)(y(t)-C(t)\hat{x}(t|t-T))$$

$$P(t|t)=P(t|t-T)-K_f(t)C(t)P(t|t-T)$$

$$\hat{x}(t|t+T)=A\hat{x}(t|t)+Bu(t)$$

$$P(t+T|t)=AP(t|t)A^T+R_1(t). \quad (1)$$

In (1), $\hat{x}(t|t-T)$ denotes the state prediction, based on data up to time t−T, $\hat{x}(t|t)$ denotes the filter update, based on data up to time t, P(t|t−T) denotes the covariance of the state prediction, based on data up to time t−T, P(t|t) denotes the covariance of the filter update, based on data up time t, and $K_f(t)$ denotes the time variable Kalman gain matrix. The quantities A, B, C(t), $R_1(t)$ and $R_2(t)$ are the system matrix, the input matrix, the measurement matrix, the systems noise covariance matrix and the measurement noise matrix, respectively. Their use and design are discussed in any standard textbook on Kalman filtering and are therefore not discussed further here.

The power scaling algorithm is based on the following result, proved in [3]: Assume that solutions $\hat{x}(t|t-T)$, $\hat{x}(t|t)$, P(t|t−T), P(t|t) are computed from (1) for $t>t_0$ using initial values $\hat{x}_0(t_0|t_0-T)$ and $P_0(t_0|t_0-T)$. Then, if (1) is rerun from $\hat{x}_0(t_0|t_0-T)$ and $P_0(t_0|t_0-T)$ using the scaled covariance matrices $R_1^v(t)=v^2(t)R_1(t)$ and $R_2^v(t)=v^2(t)R_2(t)$, the following results holds:

$$\hat{x}^v(t|t-T)=\hat{x}(t|t-T), t>t_0$$

$$\hat{x}^v(t|t)=\hat{x}(t|t), t>t_0$$

$$P^v(t|t-T)=v^2(t)P(t|t-T), t>t_0$$

$$P^v(t|t)=v^2(t)P(t|t), t>t_0 \quad (2)$$

where the superscript $(\,)^v$ denotes the reiterated variables.

In order to exploit the above result, it is noted that a scaling with the scale factor:

$$v(t)=\frac{\overline{y}^{RTWP}(t)}{x_{Nominal}^{RTWP}}, \quad (3)$$

where $X_{Nominal}^{RTWP}$ is the power value (of RTWP) in the linear domain for which the Kalman filter is nominally tuned and where $\overline{y}^{RTWP}(t)$ is a time average of the RTWP, results in power estimates that are the same as without scaling, and power standard deviations that are scaled a factor v(t). In particular this means that if the power level is increased a specific factor, then the probability distributions of the estimated powers spread out with the same factor. The consequence is that the number of grid points that cover the power probability distributions remains constant when the power level changes. The computation of $\overline{y}^{RTWP}(t)$ is performed by averaging in the logarithmic domain. The reason is that this gives similar rise and decay times for large power level changes.

For the above reasons, the power scaled Kalman filter is selected as:

$$\overline{y}_{log}^{RTWP}(t)=k_v\overline{y}_{log}^{RTWP}(t-T)+(1-k_v)(10^{10}\log(y^{RTWP}(t)))$$

$$V(t)=10^{\overline{y}_{log}^{RTWP}(t)/10}/x_{Nominal}^{RTWP}$$

$$K_f(t)=P(t|t-T)C^T(t)(C(t)P(t|t-T)C^T(t)+v^2(t)R_2(t))^{-1}$$

$$\hat{x}(t|t)=\hat{x}(t|t-T)+K_f(t)(y(t)-C(t)\hat{x}(t|t-T))$$

$$P(t|t)=P(t|t-T)-K_f(t)C(t)P(t|t-T)$$

$$\hat{x}(t|t+T)=A\hat{x}(t|t)+Bu(t)$$

$$P(t+T|t)=AP(T|t)A^T+v^2(t)R_1(t). \quad (4)$$

Above, $k_v$ sets the bandwidth of the scale factor adaptation and $\bar{y}_{log}^{RTWP}(t)$ is the averaging filter state. The preferred embodiment uses a variant of the above algorithm. There (1) is run as is, followed by a scaling of the estimated covariance P(t|t) with the scale factor v(t).

Figure 4:
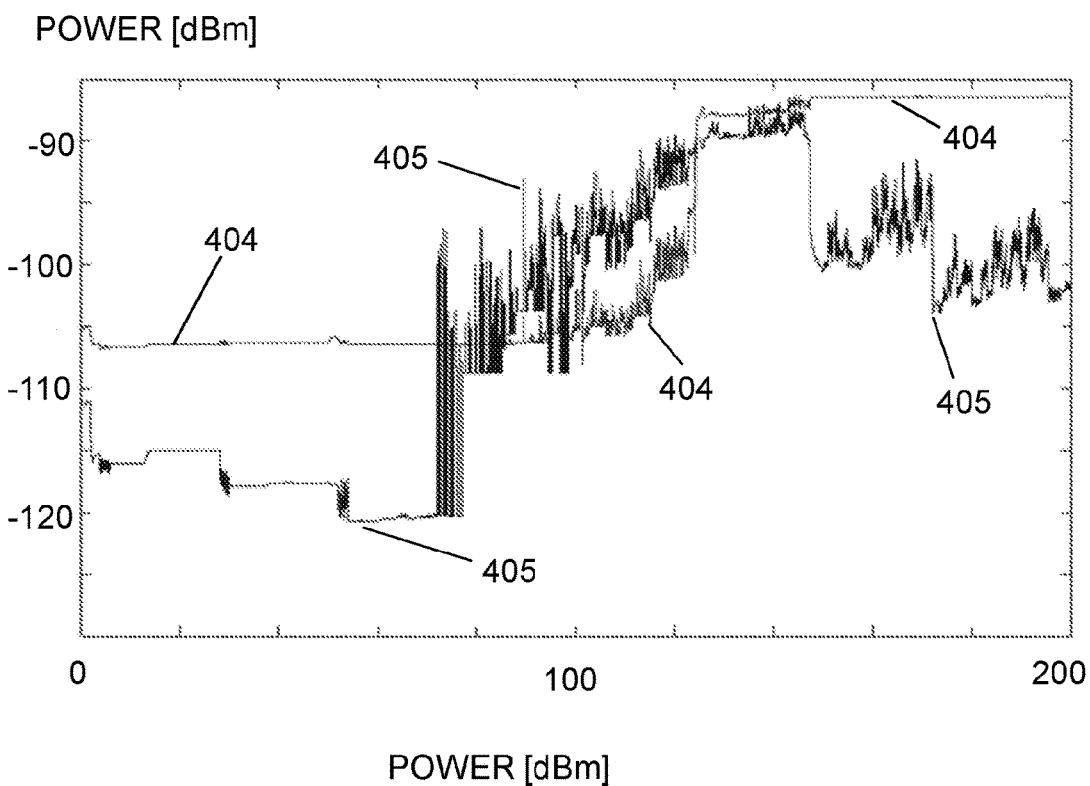
FIG. 4 illustrates thermal noise power floor tracking in response to a 20 dB in-band non WCDMA interferer, where a step occurs after 72 h.

Prior art noise floor tracking algorithms are somewhat prepared for noise floor tracking, allowing for delayed tracking of noise power floor steps caused by longer term in-band interference. The scaling described above is a crucial ingredient for this. This is illustrated by FIG. 4. Curve 404 illustrates the estimated noise floor and curve 405 illustrates the estimated noise floor standard deviation. The time constant of the thermal noise floor estimation algorithm is set to 40 h. A change in actual noise floor occurs approximately at 70 hours, causing the noise floor estimate 404 to eventually adapt to the new level. The operation is as intended, however, as can be seen in the figure the standard deviation 405 of the estimate increases immediately, causing the actual estimate to become more and more noisy. In particular, an increase of the thermal noise power floor with more than 10 dB, leads to failure of many prior art algorithms.

The present disclosure discloses a new neighbor cell interference estimation algorithm preferably based on extended Kalman filter (EKF) techniques that estimates the sum of all neighbor cell interference, experienced in the own cell context. The approach uses measurements of the load utilization and the total wideband received uplink power, as well as a computed own cell load. The estimation uses novel state individual block matrix scaling of the covariances, thereby achieving power scaling only of power dependent states. The scaling is based on a running estimate of an average uplink wideband power, preferably an estimated thermal noise power floor level.

This results in that the disclosed algorithm becomes able to handle average long term power level changes of several tens of dBs. Without these disclosed features malfunction would occur e.g. in situations with in-band non-WCDMA interference. It is stressed that the prior art scaling method described in the background section cannot be used. The reason is that it scales all states of the Kalman filter, not only the states affected by the uplink power level.

Neighbor cell interference power estimation is a subject that can be addressed with several methods. For the scope of this disclosure the set of algorithms is limited to schemes that have the following characterizing features, that are all explained below the following list:

Process measurements of the received uplink total wideband power (RTWP).
Process measurements of the load utilization of the uplink.
Jointly estimate at least the sum of the neighbor cell interference power and the noise power floor, as well as the load utilization probability.

The RTWP measurement has been extensively explained in appendix A as having the concepts of own and neighbor cell interference power. To explain the load utilization concept, it is noted that in WCDMA EUL the scheduler gives grants to UEs. These grants give the UEs the right to transmit with a certain rate and power. The UE does however not have to use the grants. This freedom of the UE creates large problems for the estimation of uplink load. The reason is that in practice, field trials reveal a load utilization that is sometimes less than 25%. Unless accounted for, the scheduler will believe that the load is then much higher than it actually is. The result of this is that the scheduler stops granting too early, resulting in under-utilization of the UL. Such waste is not acceptable in today's market.

The solution, as advocated here, is to account for the measured utilization in the estimation of interference powers, like neighbor cell interference. This can be done as explained further below, where a preferred example embodiment of a neighbor cell interference estimator is described. There, the estimated neighbor cell interference is made dependent on an additional estimate of the load utilization, here treated as a probability. This estimate is supported by measurement closely related to the estimated load utilization. This way, the accuracy of the neighbor cell interference power estimate is boosted. Secondly, the availability of these measurements at Transmission Time Interval (TTI) rate, together with the accuracy of the estimates, allows also for a very high bandwidth of the estimates. Since the estimates are accurate, less filtering is needed for smoothing and noise suppression which in turn enhances the bandwidth.

Figure 6:
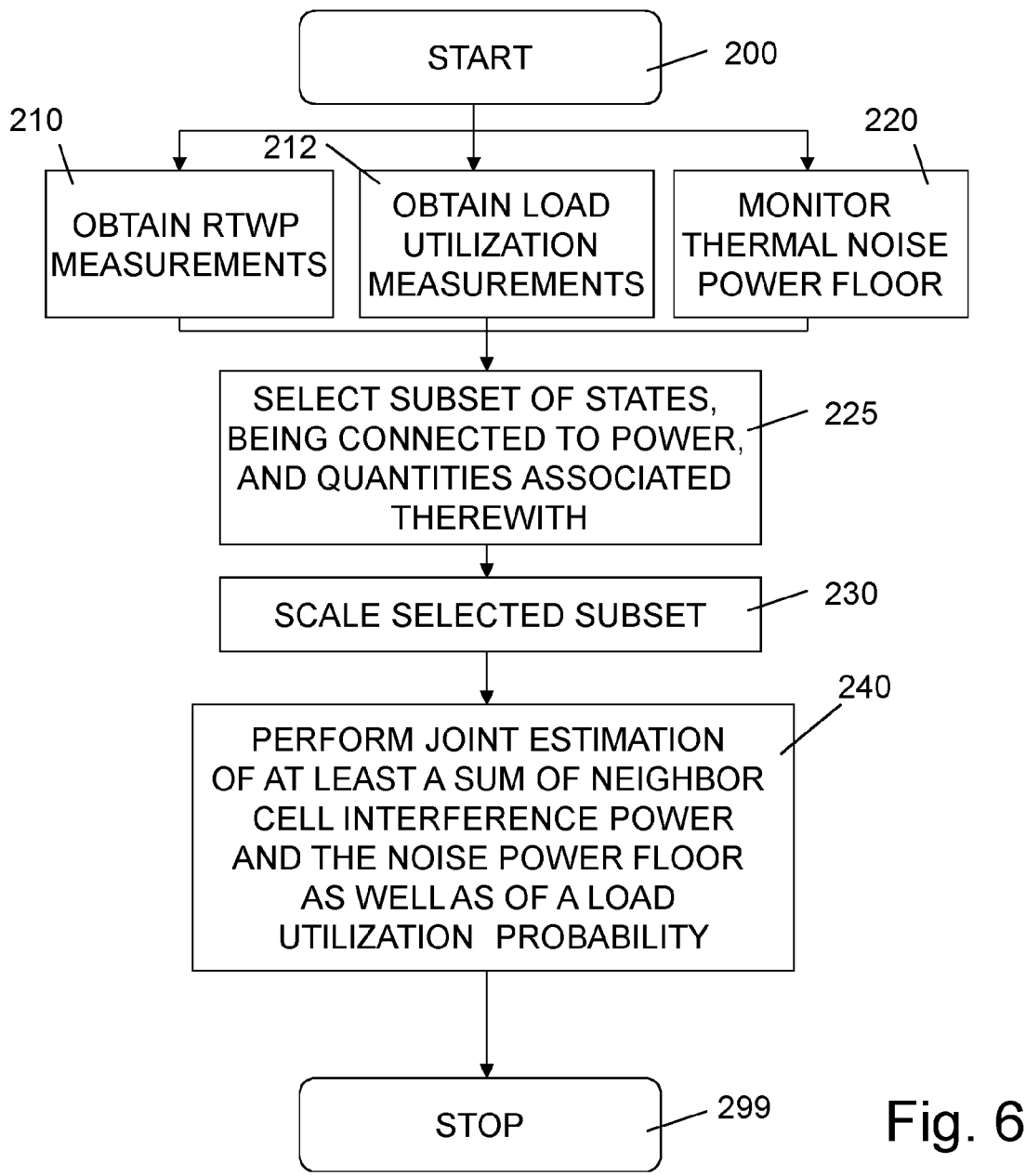
FIG. 6 is a flow diagram of steps of an embodiment of a method for neighbor cell interference estimation in the UpLink of a CDMA communication system.

FIG. 6 illustrates a flow diagram of steps of an embodiment of a method for neighbor cell interference estimation in an UpLink of a CDMA communication system. The process starts in step 200. In step 210, RTWP measurements are obtained, preferably measured by a power meter. In step 212, load utilization measurements are obtained, preferably by a comparison between a scheduled own load with the used own load. In step 220, thermal noise power floor is monitored by performing a running estimate of a long-time average uplink wideband power, preferably an estimated thermal noise power floor level or an operational level of the RTWP, continuously or intermittently. In step 225, a subset of the states of the estimation is selected, comprising only all states of the estimation that are associated with powers. The states of the selected subset and quantities associated therewith are scaled in step 230 with a scaling factor. The scaling factor depends on the running estimate, preferably with a linear dependency. In step 240, at least a sum of the neighbor cell interference power and the noise power floor as well as a load utilization probability are jointly estimated from the measurements of an uplink RTWP and the measurements of a load utilization of the uplink. The process ends in step 299.

In a system with multiple antenna branches, and scheduling per antenna branch, the above described embodiment can be run per branch. In other words, a neighbor cell interference estimator is provided for each individual branch. Note, however, that the estimator routines can be run in a common processor.

Figure 7:
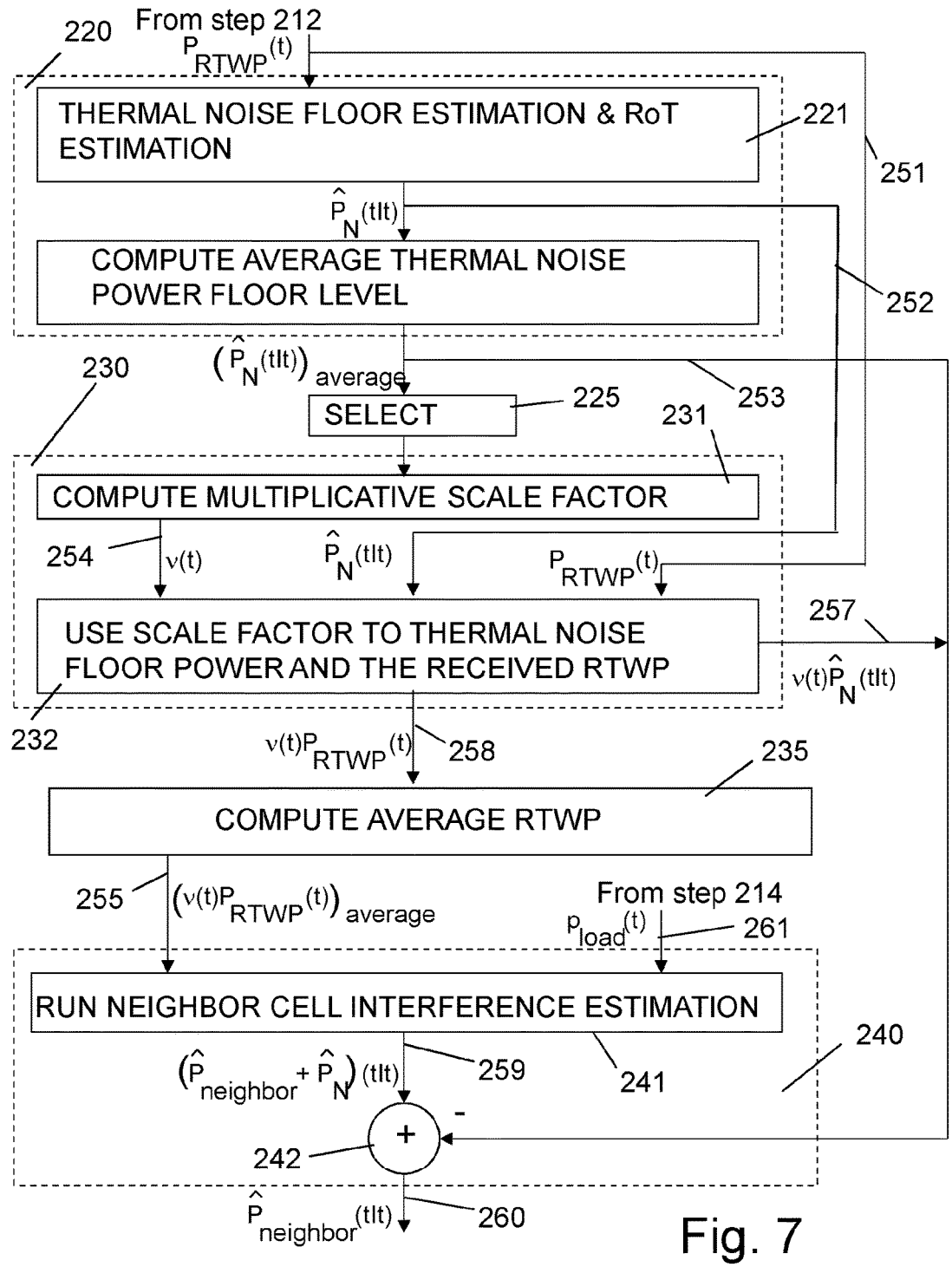
FIG. 7 is a flow diagram of selected steps of a particular embodiment of a method for neighbor cell interference estimation in the UpLink of a CDMA communication system.

In FIG. 7 selected steps of another embodiment of a method for neighbor cell interference estimation in the UpLink of a CDMA communication system is illustrated. Multiple antenna branches are assumed to be present in this case. Step 220 here comprises two part steps. First, in step 221, the thermal noise power floor estimation 252 and the RoT estimation is run individually for all co-located antenna branches with the RTWP measurements 251 as input. One instance is provided per branch. Thereafter in step 222, an average thermal noise power floor level 253 is computed, either in the logarithmic or the linear domain, over all co-located antenna branch thermal noise power floor estimates. Step 230 also comprises two part steps in this embodiment. First in step 231, for each antenna branch, the multiplicative scale factor 254 is computed that results in the average thermal noise power floor level, when the antenna branch thermal noise power floor is multiplied with the scale factor. Then in step 232, for each antenna branch, the scale factor 254 is used for scaling of the thermal noise power floor 252 and the received total wideband power 251 into scaled thermal noise power floor 257 and scaled RTWP 258. An average received total wideband power 255 is then in step 235 also computed over the different branches. Step 240 comprises the process 241 of running the neighbor cell interference estimation 259 based also on the measurements of a load utilization 261. Subtraction 242 of the estimated (and scaled) thermal noise power floor 253, 257 is then performed to obtain an estimate 260 of the neighbor cell interference.

Figure 8:
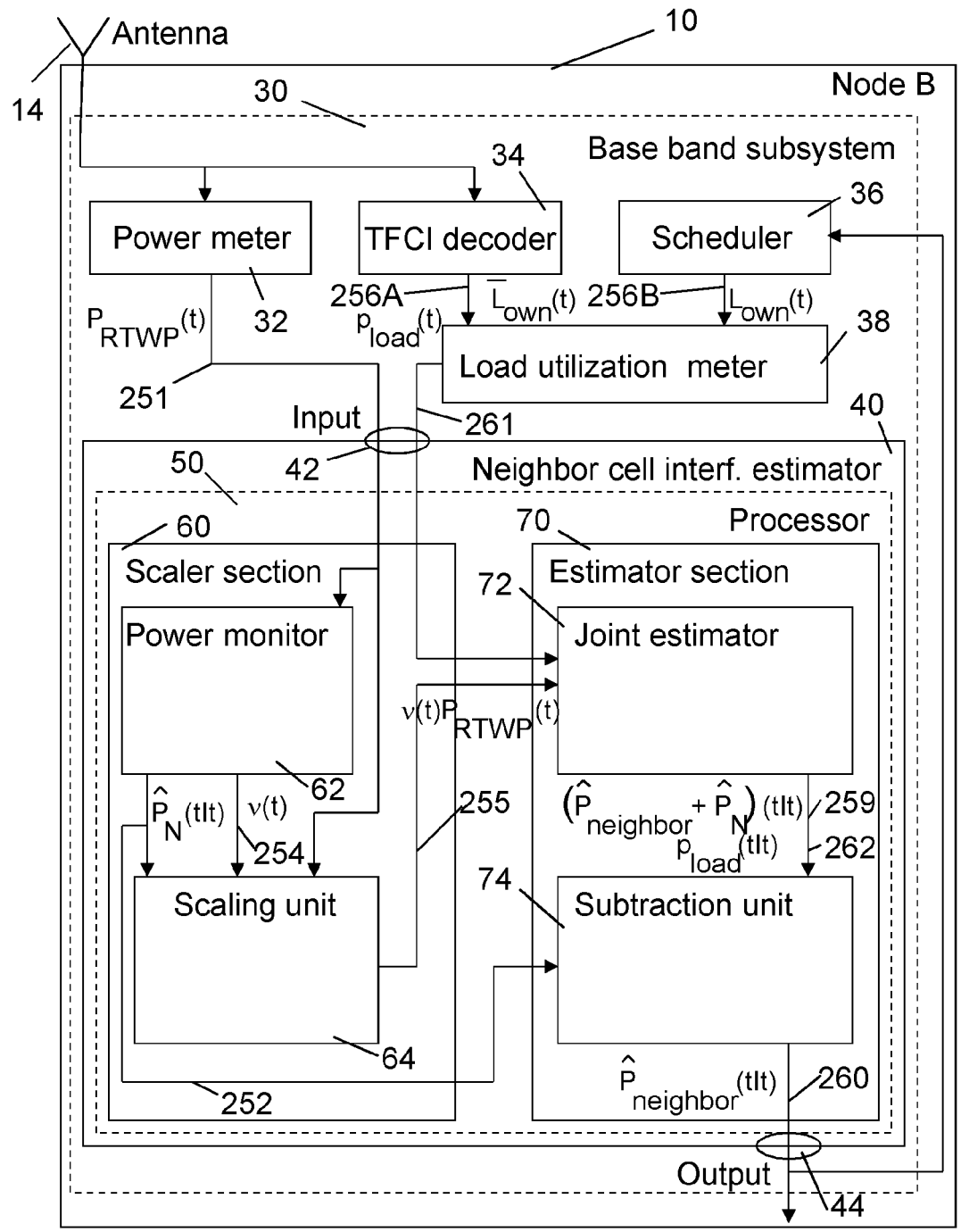
FIG. 8 is a block scheme of an embodiment of a Node B.

FIG. 8 illustrates a block diagram of an embodiment of a Node B 10. An antenna 14 is connected to a power meter 32 and a TFCI decoder 34, in this embodiment comprised in a base band subsystem 30. The used own load 256A as decoded from the TFCI decoder 34 is used by a load utilization meter 38 together with a scheduled own load 256B as received from a scheduler 36 to obtain a load utilization measurement 261. An input 42 of a neighbor cell interference estimator 40 receives the measurements of RTWP 251 and load utilization 261 and provides these to a scaler section 60, in this embodiment provided by a processor 50. In the scaler section 60, a subset of the quantities, associated with states connected to power is selected to be scaled. The RTWP measurements 251 are used in a power monitor 62 to perform a running estimate of a long-time average uplink wideband power 252, preferably an estimated thermal noise power floor level or an operational level of the RTWP. In this particular embodiment, this is performed continuously or intermittently. Based on this running estimate, a scaling factor 254 is obtained. A scaling unit 64 scales the quantities of the selected subset and the scaled quantities 255 are provided to an estimator section 70 of the processor 50 together with the non-scaled quantities not belonging to the subset to a joint estimator 72 of the estimator section 70. A sum 259 of the neighbor cell interference power and the noise power floor as well as a load utilization probability 262 are jointly estimated in the joint estimator 72 of the estimator section 70. In a subtraction unit 74 of the estimator section 70, the estimated thermal noise power floor 252 is subtracted from the sum 259, giving a pure neighbor cell interference power estimation 260, which is outputted from an output 44 of the neighbor cell interference estimator 40.

In implementations having multiple branches, in one embodiment multiple power meters and multiple TFCI decoders are provided. The scale vector is computed per branch and the result is then averaged together. In another embodiment, the monitored thermal noise floor is averaged to a common measure, on which a common scale vector is based.

Examples of algorithmic principles that can be used for the above neighbor cell interference estimation problems include general Bayesian estimation algorithms. Examples of this include so called particle filters. The extended Kalman filter (EKF), typically in combination with a separate thermal noise power estimation scheme, is described further below. Maximum likelihood estimation algorithms can also be used.

It will be appreciated that the methods and devices described above can be combined and re-arranged in a variety of ways.

For example, embodiments may be implemented in hardware, or in software for execution by suitable processing circuitry, or a combination thereof.

The steps, functions, procedures, modules and/or blocks described above may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules and/or blocks described above may be implemented in software such as a computer program for execution by suitable processing circuitry including one or more processing units.

The flow diagram or diagrams presented above may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors, DSPs, one or more Central Processing Units, CPUs, video acceleration hardware, and/or any suitable programmable logic circuitry such as one or more Field Programmable Gate Arrays, FPGAs, or one or more Programmable Logic Controllers, PLCs.

It should also be understood that it may be possible to re-use the general processing capabilities of any conventional device or unit in which the proposed technology is implemented. It may also be possible to re-use existing software, e.g. by reprogramming of the existing software or by adding new software components.

A specific and detailed preferred embodiment for neighbor cell interference estimation is presented here below. In the following section a new high performing estimator algorithm for neighbor cell interference estimation is proposed. The scope is to perform a joint estimation of $P_{neighbor}(t)+P_N(t)$, $P_N(t)$ $P_{neighbor}(t)$ and the load utilization probability $p_{load}(t)$. The proposed and preferred embodiment is provided by an extended Kalman filter (EKF).

The estimation algorithm will use the following available information. Measurements of $P_{RTWP}(t)$, with a sampling rate of $T_{RTWP}=k_{RTWP}TTI$, $k_{RTWP} \in Z+$ are available for each antenna branch. Computed load factors $L_{own}(t)$, with a sampling rate of $T_L=k_L TTI$, $k_L \in Z+$ are available per cell. They are valid on cell level, but not necessarily valid on antenna branch level with Rx diversity. The loop delay $T_D$ between the calculation of $L_{own}(t)$, and the time it takes effect on the air interface are also available. The loop delay is dependent on the TTI, which is available for and valid per cell. Measured load factors $\overline{L}_{own}(t)$, with a sampling rate of $T_{\overline{L}}=k_{\overline{L}}TTI$, $k_{\overline{L}} \in Z+$ are available per cell. They are valid on cell level, but not necessarily valid on antenna branch level with Rx diversity if the scheduling is performed jointly for all branches. It will however, be available also on an antenna branch level if scheduling is performed per branch. They are obtained after TFCI decoding. The loop delay $\overline{T}_D$ between the calculation of $L_{own}(t)$, and the time it takes effect on the air interface are also available. The loop delay is dependent on the TTI and larger than $T_D$ since the measured load factor calculation requires TFCI and E-TFCI decoding.

The states are selected as:

$$x_1(t)=p_{load}(t) \qquad (5)$$

$$x_2(t)=P_{neighbor}(t)+P_N(t) \qquad (6)$$

$$X_3(t) = \Delta \overline{L}_{own}(t) \quad (7)$$

$$x_4(t) = x_1(t - t_{TTI}). \quad (8)$$

Since an additional decoding delay of (about) one TTI affects the loop, $x_1(t)$ needs to be delayed by an extra state to define the fact that the load utilization probability measurement is subject to an additional delay of one TTI. The state $x_4(t)$ is used for this purpose. $\Delta L_{own}(t)$ represents a slowly varying load factor bias error in the measurement model.

Note that an alternative would instead be to introduce the first state as the estimated own cell load factor.

Measurement Model for RTWP:

The first measured signal that is available for processing is $P_{RTWP}(t)$. The scheduled load of the own cell $L_{own}(t)$ is a computed quantity (currently based on SINR measurements), for this reason a measurement model of $P_{RTWP}(t)$ is needed, expressed in terms of the states, computed quantities and a measurement uncertainty. Towards this end it is first noted that the load of (A6) does not account for the load utilization probability $R_{load}(t)$. Neither does it account for the delay $T_D$. To model the load utilization effect, and to compensate for semi-constant load factor errors, the present disclosure suggests that load underutilization can be modeled by a modification of (A5) and (A6) to:

$$L_{own,utilized}(t) = \sum_{i=1}^{I} p_{load}(t) L_i(t - T_D) + \Delta \overline{L}_{own}(t) = p_{load}(t) L_{own}(t - T_D) + \Delta \overline{L}_{own}(t) \quad (9)$$

$$P_{RTWP}(t) = L_{own,utilized}(t) P_{RTWP}(t) + P_{neighbor}(t) + P_N(t) \quad (10)$$

which results in:

$$P_{RTWP}(t) = \frac{1}{1 - L_{own}(t - T_D) p_{load}(t) + \Delta \overline{L}_{own}(t)} (P_{neighbor}(t) + P_N(t)). \quad (11)$$

After addition of a zero mean white measurement noise $e_{RTWP}(t)$ and replacement of variables by the states of (5)-(8), the following nonlinear measurement equation results:

$$y_{RTWP}(t) = \frac{x_2(t)}{1 - L_{own}(t - T_D) x_1(t) + x_3(t)} + e_{RTWP}(t) \quad (12)$$

$$R_{2,RTWP}(t) = E[e_{RTWP}^2(t)]. \quad (13)$$

Here $y_{RTWP}(t) = P_{RTWP}(t)$ and $R_{2,RTWP}(t)$ denotes the (scalar) covariance matrix of $e_{RTWP}(t)$. Note that the load of the own cell is computed using both EUL and R99 traffic, hence in this case the delay is valid for both.

Note that in case the own cell load would be estimated instead, $L_{own}(t-T_D) x_1(t)$ would be expressed by a state directly modeling the estimated load factor of the own cell. The own cell load factor appearing in (12) is treated as a known time varying factor in that equation, not as an estimate.

Note also that (12) represents a nonlinear load curve, expressed in terms of the estimated sum of neighbor cell interference and noise floor power ($x_2(t)$), the estimated load utilization probability ($x_2(t)$), and the estimated load factor bias ($x_3(t)$). Further the computed ("received") load factor is used in the nonlinear load curve. Equation (12) relates the momentary combined effect of the estimated quantities and received quantities to the left hand side of the equation, i.e. the momentary measurement of the wideband power.

Measurement Model for Load Utilization Probability:

The measurement of load utilization probability can be made available per cell. In a first step the decoded TFCIs and Enhanced Dedicated CHannel TFCIs (E-TFCIs) show which grants the UE actually used in the last TTI. This provides the information needed to compute the actual load factor of the last TTI, i.e. to compute:

$$p_{load}(t) = \frac{L_{own}(t - T_D)}{\overline{L}_{own}(t - T_D)}. \quad (14)$$

With this modification the measurement model for the load utilization probability measurement becomes:

$$y_{loadUtilization}(t) = x_4(t) + e_{loadUtilization}(t) \quad (15)$$

$$R_{2,loadUtilization}(t) = E[e_{loadUtilization}(t)]^2. \quad (16)$$

Note that the transformation (14) essentially replaces the granted load factor, $L_{own}(t-T_D)$, with the load factor computed based on received TFCIs and E-TFCIs.

Dynamic State Model

Random walk models are adapted for the state variables $x_1(t)$ and $x_2(t)$. In order to avoid a drifting bias correction of the load factor, an autoregressive model is used for the state $x_3(t)$ A further motivation for this is that the state is expected to model errors that over an ensemble have a zero mean. Hence the following state model results from the states of (5)-(8):

$$x(t + T_{TTI}) \equiv \begin{pmatrix} x_1(t + T_{TTI}) \\ x_2(t + T_{TTI}) \\ x_3(t + T_{TTI}) \\ x_4(t + T_{TTI}) \end{pmatrix} = \begin{pmatrix} 1 & 0 & 0 & 0 \\ 0 & 1 & 0 & 0 \\ 0 & 0 & a & 0 \\ 1 & 0 & 0 & 0 \end{pmatrix} \begin{pmatrix} x_1(t) \\ x_2(t) \\ x_3(t) \\ x_4(t) \end{pmatrix} + \begin{pmatrix} w_1(t) \\ w_2(t) \\ w_3(t) \\ w_4(t) \end{pmatrix} \quad (17)$$

$$R_1(t) = E\left[ \begin{pmatrix} w_1(t) \\ w_2(t) \\ w_3(t) \\ w_4(t) \end{pmatrix} (w_1(t) \ w_2(t) \ w_4(t) \ w_4(t)) \right]. \quad (18)$$

Note that by setting a=1 a random walk model is obtained for all states. Again, a diagonal covariance matrix is commonly used. The last component of the system noise is preferably selected to be very small, reflecting the pure delay it is intended to model.

The General Extended Kalman Filter

The state space model behind the extended Kalman filter (EKF) is in the present embodiment:

$$x(t+T) = A(t)x(t) + B(t)u(t) + w(t). \quad (19)$$

$$y(t) = c(x(t)) + e(t). \quad (20)$$

Here x(t) is the state vector, u(t) is an input vector that is not used here, y(t) is an output measurement vector consisting of the power measurements performed in the cell i.e. the total received wideband power, RTWP), w(t) is the so called systems noise that represent the model error, and e(t) denotes the measurement error. The matrix A(t) is the system matrix describing the dynamic modes, the matrix B(t) is the input gain matrix, while the vector c(x(t)) is the, possibly nonlinear, measurement vector which is a function of the states of the system. Finally t represents the time and T represents the sampling period.

The general case with a nonlinear measurement vector is considered here. For this reason the extended Kalman filter needs to be applied. This filter is given by the following matrix and vector iterations:

Initialization $t = t_0$ $\hat{x}(0|-1) = x_0$ $P(0|-1) = P_0$

Iteration $$t = t + T \qquad (21)$$

$$C(t) = \frac{\partial c(x)}{\partial x}\bigg|_{x = \hat{x}(t|t-T)}$$

$$K_f(t) = P(t|t-T)C^T(t)(C(t)P(t|t-T)C^T(t) + R_2(t))^{-1}$$

$$\hat{x}(t|t) = \hat{x}(t|t-T) + K_f(t)(y(t) - c(\hat{x}(t|t-T)))$$

$$P(t|t) = P(t|t-T) - K_f(t)C(t)P(t|t-T)$$

$$\hat{x}(t+T|t) = A\hat{x}(t|t) + Bu(t)$$

$$P(t+T|t) = AP(t|t)A^T + R_1.$$

End

The quantities introduced by the filter iterations (21) are as follows. $\hat{x}(t|t-T)$ denotes the state prediction, based on data up to time t–T, $\hat{x}(t|t)$ denotes the filter update, based on data up to time t, $P(t|t-T)$ denotes the covariance matrix of the state prediction, based on data up to time t–T, and $P(t|t)$ denotes the covariance matrix of the filter update, based on data up to time t. C0 denotes the linearized measurement matrix (linearization around the most current state prediction), $K_f(t)$ denotes the time variable Kalman gain matrix, $R_2(t)$ denotes the measurement covariance matrix, and $R_1(t)$ denotes the system noise covariance matrix. It can be noted that $R_1(t)$ and $R_2(t)$ are often used as tuning variables of the filter. In principle the bandwidth of the filter is controlled by the matrix quotient of $R_1(t)$ and $R_2(t)$.

Note that the extended Kalman filter, as such, is known in prior art. It is the way it is applied according to the measurement models and dynamic state models that taken together create the novel advantages. Note also that the specific EKF estimator is one alternative prior art algorithm, other exist but would be tedious to describe.

An Embodiment of a Detailed Estimation Scheme Using the EKF

The quantities of the EKF for estimation of neighbor cell interference, load utilization load factor bias can now be defined. Using (12)-(13) and (15)-(18) it follows that:

$$C(t) = \begin{pmatrix} C_{11}(t) & C_{12}(t) & C_{13}(t) & 0 \\ 0 & 0 & 0 & C_{24}(t) \end{pmatrix} \qquad (22)$$

$$C_{11}(t) = \frac{L_{own}(t-T_D)\hat{x}_2(t|t-T_{TTI})}{(1 - L_{own}(t-T_D)\hat{x}_1(t|t-T_{TTI}) + \hat{x}_3(t|t-T_{TTI}))^2} \qquad (23)$$

$$C_{12}(t) = \frac{1}{1 - L_{own}(t-T_D)\hat{x}_1(t|t-T_{TTI}) + \hat{x}_3(t|t.-T_{TTI})} \qquad (24)$$

$$C_{13}(t) = -\frac{\hat{x}_2(t|t-T_{TTI})}{(1 - L_{own}(t-T_D)\hat{x}_1(t|t-T_{TTI}) + \hat{x}_3(t|t-T_{TTI}))^2} \qquad (25)$$

$$C_{24}(t) = 1 \qquad (26)$$

$$R_2(t) = E\left[\begin{pmatrix} e_{RTWP}(t) \\ e_{loadUtilization}(t) \end{pmatrix} \begin{pmatrix} e_{RTWP}(t) & e_{loadUtilization}(t) \end{pmatrix}\right] \qquad (27)$$

$$\begin{pmatrix} R_{2,11}(t) & R_{2,12}(t) \\ R_{2,12}(t) & R_{2,22}(t) \end{pmatrix}$$

$$c(\hat{x}(t|t-T_{TTI})) = \begin{pmatrix} \dfrac{\hat{x}_2(t|t-T_{TTI})}{1 - L_{own}(t-T_D)\hat{x}_1(t|t-T_{TTI}) + \hat{x}_3(t|t-T_{TTI})} \\ \hat{x}_4(t|t-T_{TTI}) \end{pmatrix} \qquad (28)$$

$$A = \begin{pmatrix} 1 & 0 & 0 & 0 \\ 0 & 1 & 0 & 0 \\ 0 & 0 & a & 0 \\ 1 & 0 & 0 & 0 \end{pmatrix} \qquad (29)$$

$$B = 0 \qquad (30)$$

$$R_1(t) = E\left[\begin{pmatrix} w_1(t) \\ w_2(t) \\ w_3(t) \\ w_4(t) \end{pmatrix} \begin{pmatrix} w_1(t) & w_2(t) & w_3(t) & w_4(t) \end{pmatrix}\right] \qquad (31)$$

$$= \begin{bmatrix} R_{1,11}(t) & R_{1,12}(t) & R_{1,13}(t) & R_{1,14}(t) \\ R_{1,12}(t) & R_{1,22}(t) & R_{1,23}(t) & R_{1,24}(t) \\ R_{1,13}(t) & R_{1,23}(t) & R_{1,33}(t) & R_{1,34}(t) \\ R_{1,14}(t) & R_{1,24}(t) & R_{1,34}(t) & R_{1,44}(t) \end{bmatrix}.$$

In order to execute the EKF, the state prediction and the state covariance prediction at time t given by the following equations are needed:

$$\hat{x}(t|t-T_{TTI}) = \begin{pmatrix} \hat{x}_1(t|t-T_{TTI}) \\ \hat{x}_2(t|t-T_{TTI}) \\ \hat{x}_3(t|t-T_{TTI}) \\ \hat{x}_4(t|t-T_{TTI}) \end{pmatrix} \qquad (32)$$

$$P(t|t-T_{TTI}) = \qquad (33)$$

$$\begin{pmatrix} P_{11}(t|t-T_{TTI}) & P_{12}(t|t-T_{TTI}) & P_{13}(t|t-T_{TTI}) & P_{14}(t|t-T_{TTI}) \\ P_{12}(t|t-T_{TTI}) & P_{22}(t|t-T_{TTI}) & P_{23}(t|t-T_{TTI}) & P_{24}(t|t-T_{TTI}) \\ P_{13}(t|t-T_{TTI}) & P_{23}(t|t-T_{TTI}) & P_{33}(t|t-T_{TTI}) & P_{34}(t|t-T_{TTI}) \\ P_{14}(t|t-T_{TTI}) & P_{24}(t|t-T_{TTI}) & P_{34}(t|t-T_{TTI}) & P_{44}(t|t-T_{TTI}) \end{pmatrix}.$$

The equations (22)-(33) define the EKF completely, when inserted in (21). The final step is to compute the neighbor cell interference estimate as:

$$\hat{P}_{neighbor}(t|t) = \hat{x}_2(t|t) - \hat{P}_N(t|t), \quad (34)$$

where $\hat{P}_{neighbor}(t|t)$ is preferably obtained by the techniques of [1]-[3].

State Dependent Block Matrix Power Normalization

In cases where only a subset of the states and/or measurements are affected by the absolute power level, the method of (1)-(4) is not applicable. It namely scales the complete covariance matrices. Another method is hence needed in order to achieve a neighbor cell interference estimation scheme that is robust against in-band non-WCDMA interference and other effects that may cause a lasting change of the thermal noise power floor level. In this case the intention of the algorithm of the previous section need not be considered.

In order to arrive at a normalization scheme the state vector and the measurement vector are divided in blocks where the upper blocks are subject to power normalization and the lower blocks are not. The division into blocks is in fact arbitrary and any ordering of the state vectors may be used. The choice here is made for reasons of clarity of presentation. The state and measurement vectors are hence:

$$x(t) = (x_{Power}^T(t) x_{NonPower}^T(t))^T \quad (35)$$

$$y(t) = (Y_{Power}^T(t) y_{NonPower}^T(t))^T, \quad (36)$$

where the subscripts hence indicate power dependence.

Note first that a sudden increase of the reference level, i.e. the thermal noise power floor, will lead to a corresponding upward adjustment of the interference level of the cell because of the inner power control loop. This means that at least the own cell power will be scaled up with a scale factor corresponding to the noise power floor increase. This may be the case also for the neighbor cell interference in case the in-band interference covers also the surroundings of the own cell. It does not have to, but it may. The consequence of this is that the power dependant states of the EKF above need to be allowed to vary over a correspondingly wider range in the linear power domain. Again, they may not, but they must be allowed to. The obvious conclusion is that the size of the system noise that affects these states needs to be increased correspondingly. The same thing goes for the measurement noise since the automatic gain control (AGC) circuitry tends to keep the relative measurement accuracy of powers invariant.

To formalize the above, the systems noise $w_{scaled}(t)$ and the measurement noise $e_{scaled}(t)$ corresponding to (35) and (36) need to obey $$w_{Scaled}(t) = \begin{pmatrix} w_{Power}(t) \\ w_{NonPower}(t) \end{pmatrix} = \begin{pmatrix} v & 0 \\ 0 & 1 \end{pmatrix} w(t) \quad (37)$$

$$e_{Scaled}(t) = \begin{pmatrix} e_{Power}(t) \\ e_{NonPower}(t) \end{pmatrix} = \begin{pmatrix} v & 0 \\ 0 & 1 \end{pmatrix} e(t), \quad (38)$$

where w(t) and e(t) are the un-scaled noises. Computing the covariance matrices then results in:

$$R_{1,Scaled}(t) = \begin{pmatrix} v^2 R_{1,Power,Power}(t) & v R_{1,Power,NonPower}(t) \\ v R_{1,Power,NonPower}^T(t) & R_{1,NonPower,NonPower}(t) \end{pmatrix} \quad (39)$$

-continued $$R_{2,Scaled}(t) = \begin{pmatrix} v^2 R_{2,Power,Power}(t) & v R_{2,Power,NonPower}(t) \\ v R_{2,Power,NonPower}^T(t) & R_{2,NonPower,NonPower}(t) \end{pmatrix}. \quad (40)$$

The quantity v is the power scale factor, in this particular embodiment given by:

$$v = \frac{\hat{P}_N(t|t)}{P_{N,nominal}}, \quad (41)$$

where $P_{N,nominal}$ is a nominal power level.

In a general embodiment, the scaling factor depends on the running estimate. In a preferred embodiment, this dependency is a linear dependency. Most preferably, as e.g. in the embodiment illustrated above, the scaling factor is a ratio between the monitored running estimate and a nominal value of the average uplink wideband power.

As mentioned earlier, the neighbor cell interference estimation algorithm has a high bandwidth and high accuracy and adapts automatically to average long term power changes. This can be useful in cases where a desensitization functionality is used. Commonly in small radio base stations, e.g. pico radio base stations and particularly in indoor systems, an approach for achieving a balanced uplink and downlink coverage is based on desensitization. To this end, noise is added to the RTWP that is measured in the radio base station. This artificially increases the experienced noise floor and the receiver sensitivity decreases. The result of such adding of noise is a balanced coverage for the DL and UL. Relatively large effects can be used, even up to 35 dB.

In an embodiment of a baseband subsystem, this can be realized in that the input, capable of receiving UL RTWP measurements, is further operable to add noise to such received measurements. In a method point of view, the step of obtaining measurements of an UL RTWP further comprises the addition of noise. The neighbor cell interference estimation algorithm then adapts for this artificially created noise floor level. Since the adaptation is relatively fast, such desensitization can be turned on and off without causing any larger difficulties for the neighbor cell interference estimation.

Figure 9:
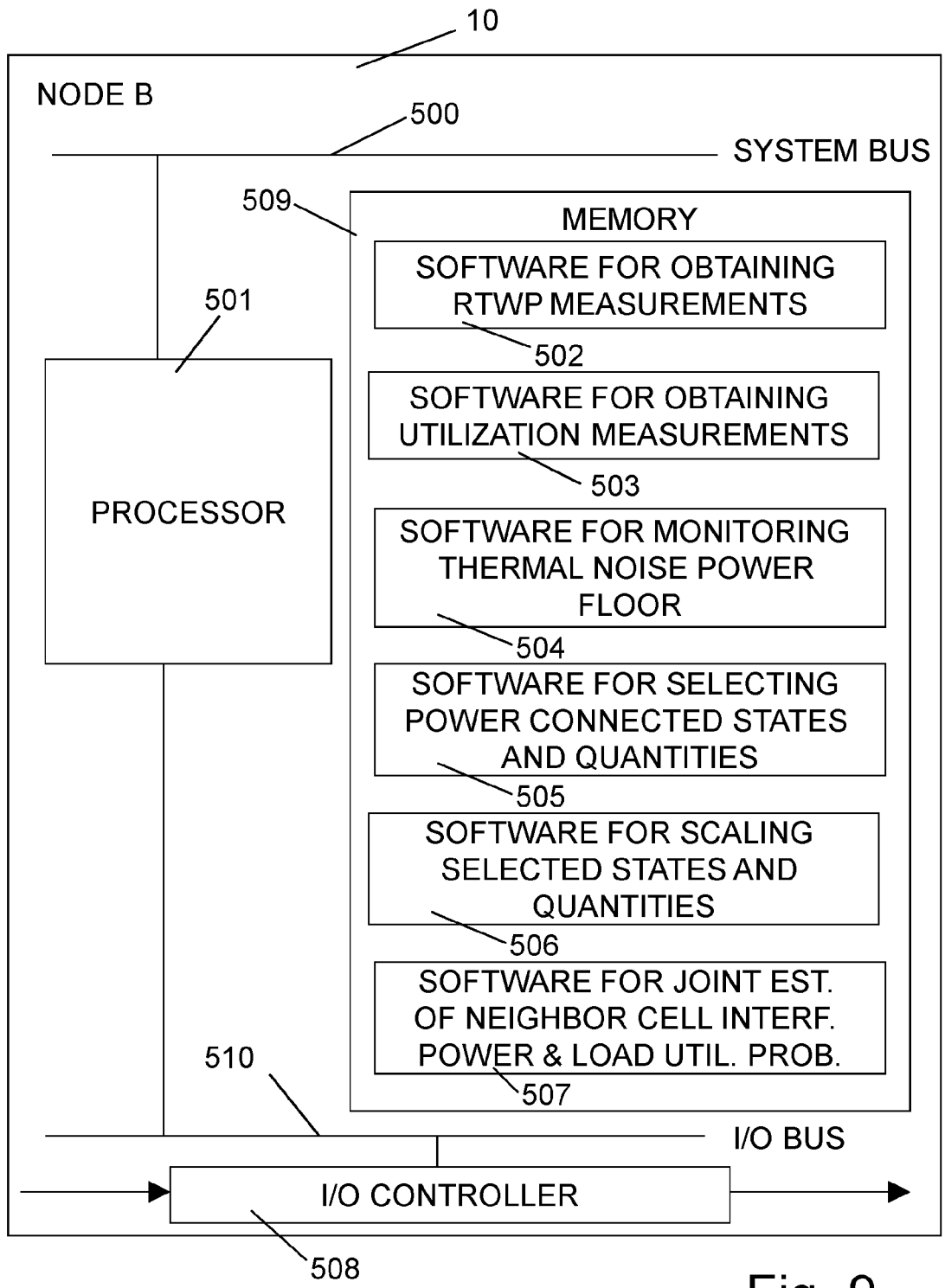
FIG. 9 is a block scheme of an embodiment of an implementation of a Node B.

In one particular embodiment, the neighbor cell interference estimator functionalities in a Node B are implemented by a processor by means of software. Such an implementation example, is illustrated in FIG. 9 as a block diagram. This embodiment is based on a processor 501, a memory 509, a system bus 500, an input/output (I/O) controller 508 and an I/O bus 510. In this embodiment power measurements and load utilization are received by the I/O controller 508 and are stored in the memory 509. The I/O controller 508 also controls the issue of the neighbor cell interference estimates. The processor 501, which may be implemented as one or a set of cooperating processors, executes software components stored in the memory 509 for performing the estimations. The processor 501 communicates with the memory 509 over the system bus 500. In particular, software component 502 may implement the functionality of obtaining RTWP measurements. Software component 503 may implement the functionality of obtaining load utilization measurements. Software component 504 may implement the functionality of monitoring thermal noise floor power. Software component 505 may implement the functionality of selecting power connected states and quantities related thereto for scaling purposes. Software component 506 may implement the functionality of scaling of power connected states and quantities related thereto. Software component 507 may implement the functionality of joint estimation of neighbor cell interference power and load utilization probability.

The term "computer" or "processor" should be interpreted in a general sense as any system or device capable of executing program code or computer program instructions to perform a particular processing, determining or computing task.

In a particular embodiment, the computer program comprises program code which when executed by the processing circuitry or computer causes the processing circuitry or computer to obtain measurements of an uplink received total wideband power and to obtain measurements of a load utilization of the uplink. The computer program further causes the processing circuitry or computer to jointly estimate at least a sum of a neighbor cell interference power and a noise power floor as well as a load utilization probability from the measurements of an uplink received total wideband power and the measurements of a load utilization of the uplink. The computer program further causes the processing circuitry or computer to monitor a thermal noise power floor performing a running estimate of a long-time average uplink wideband power, to select a subset of states of said estimation, comprising only all states of the estimation that are associated with powers and to scale states of said selected subset of states and quantities associated therewith with a scaling factor, said scaling factor being dependent on said running estimate, whereby said scaled states are utilizable for performing said jointly estimating.

As indicated above, the wireless device may alternatively be defined as a group of function modules, where the function modules are implemented as a computer program running on a processor.

Figure 14:
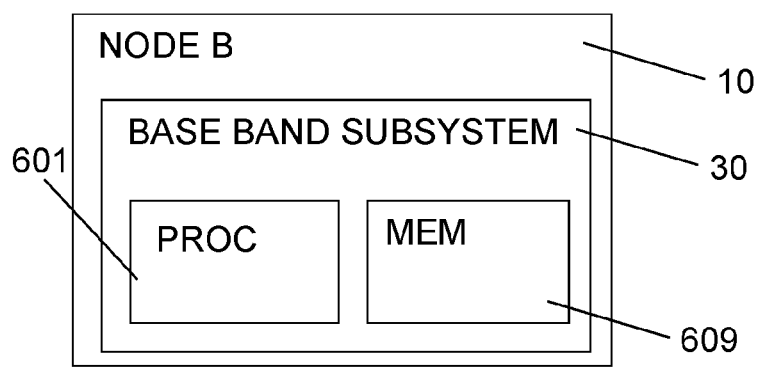
FIG. 14 illustrates a baseband subsystem of a NodeB with a computer and memory.

FIG. 14 is a schematic block diagram illustrating an example of a baseband subsystem 30 of a NodeB 10 comprising a processor 601 and an associated memory 609.

Figure 15:
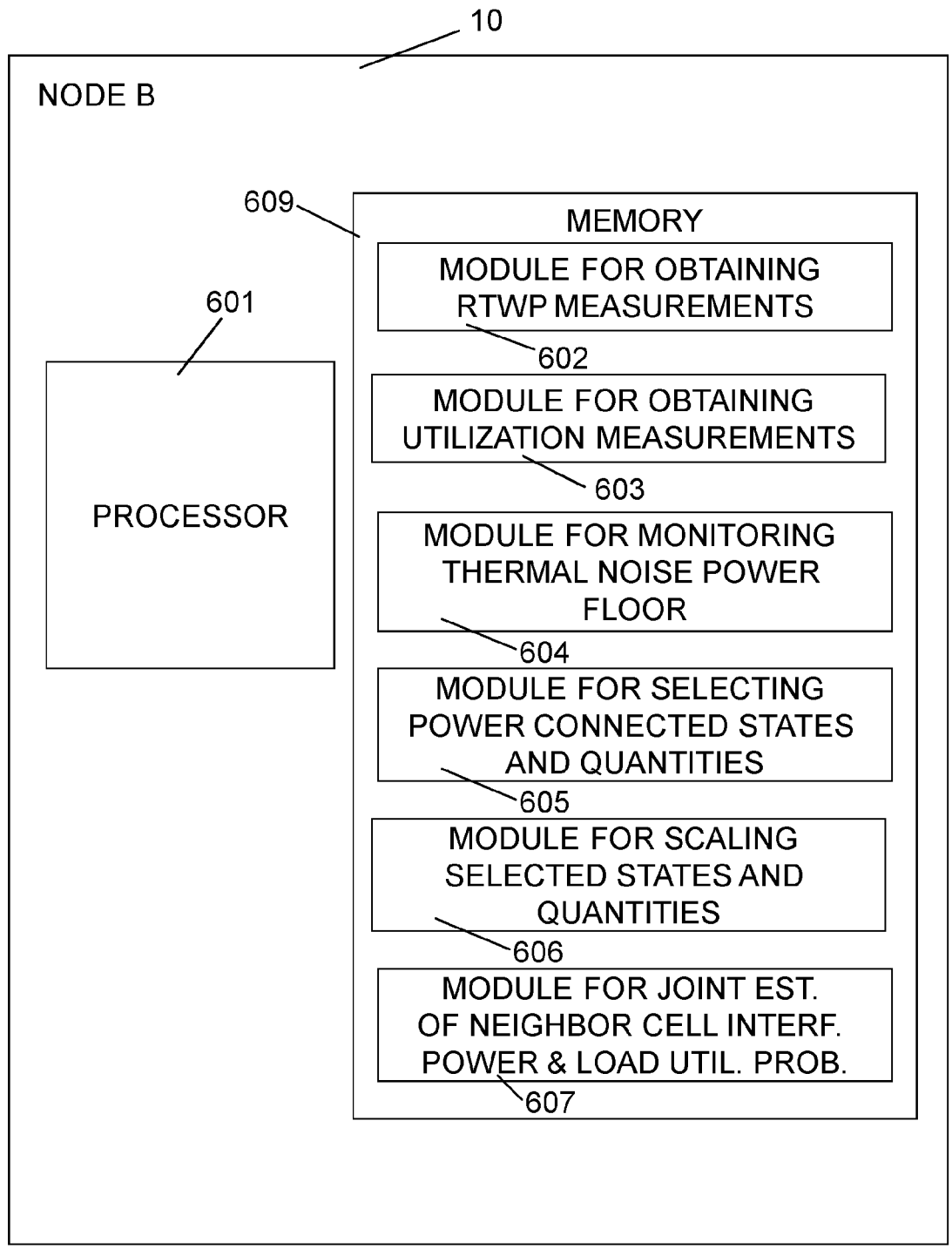
FIG. 15 illustrates an embodiment of a baseband module having function modules.

The computer program residing in memory 609 may thus be organized as appropriate function modules configured to perform, when executed by the processor, at least part of the steps and/or tasks described above. An example of such function modules is illustrated in FIG. 15. FIG. 15 is a schematic block diagram illustrating an example of a baseband subsystem of a Node B comprising a group of function modules. A first obtaining module 602 is provided for obtaining measurements of an uplink received total wideband power. A second obtaining module 603 is provided for obtaining measurements of a load utilization of the uplink. An estimating module 607 is provided for jointly estimating at least a sum of a neighbor cell interference power and a noise power floor as well as a load utilization probability from the measurements of an uplink received total wideband power and said measurements of a load utilization of the uplink. A monitoring module 604 is provided for monitoring a thermal noise power floor performing a running estimate of a long-time average uplink wideband power. A selecting module 605 is provided for selecting a subset of states of said estimation, comprising only all states of the estimation that are associated with powers. A scaling module 606 is provided for scaling states of said selected subset of states and quantities associated therewith with a scaling factor, said scaling factor being dependent on said running estimate. The scaled states are utilizable for performing said jointly estimating.

The software or computer program may be realized as a computer program product, which is normally carried or stored on a computer-readable medium. The computer-readable medium may include one or more removable or non-removable memory devices including, but not limited to a Read-Only Memory, ROM, a Random Access Memory, RAM, a Compact Disc, CD, a Digital Versatile Disc, DVD, a Universal Serial Bus, USB, memory, a Hard Disk Drive, HDD storage device, a flash memory, or any other conventional memory device. The computer program may thus be loaded into the operating memory of a computer or equivalent processing device for execution by the processing circuitry thereof.

Simulations according to the above presented ideas have been performed. The intentions with the simulations of this subsection include test and illustration of the scaling and power normalization performance of the thermal noise power floor estimation scheme as well as test and illustration of the scaling and power normalization performance of the neighbor cell interference estimation algorithm (21)-(34), with state dependent power scaling following (35)-(41).

The simulation setup uses simulation over several days to cope with the time constants of the thermal noise power floor estimator used for scaling. After 3 days the thermal noise power is increased with 20 dB, simulating a high power external interferer with a fixed power.

Figure 10:
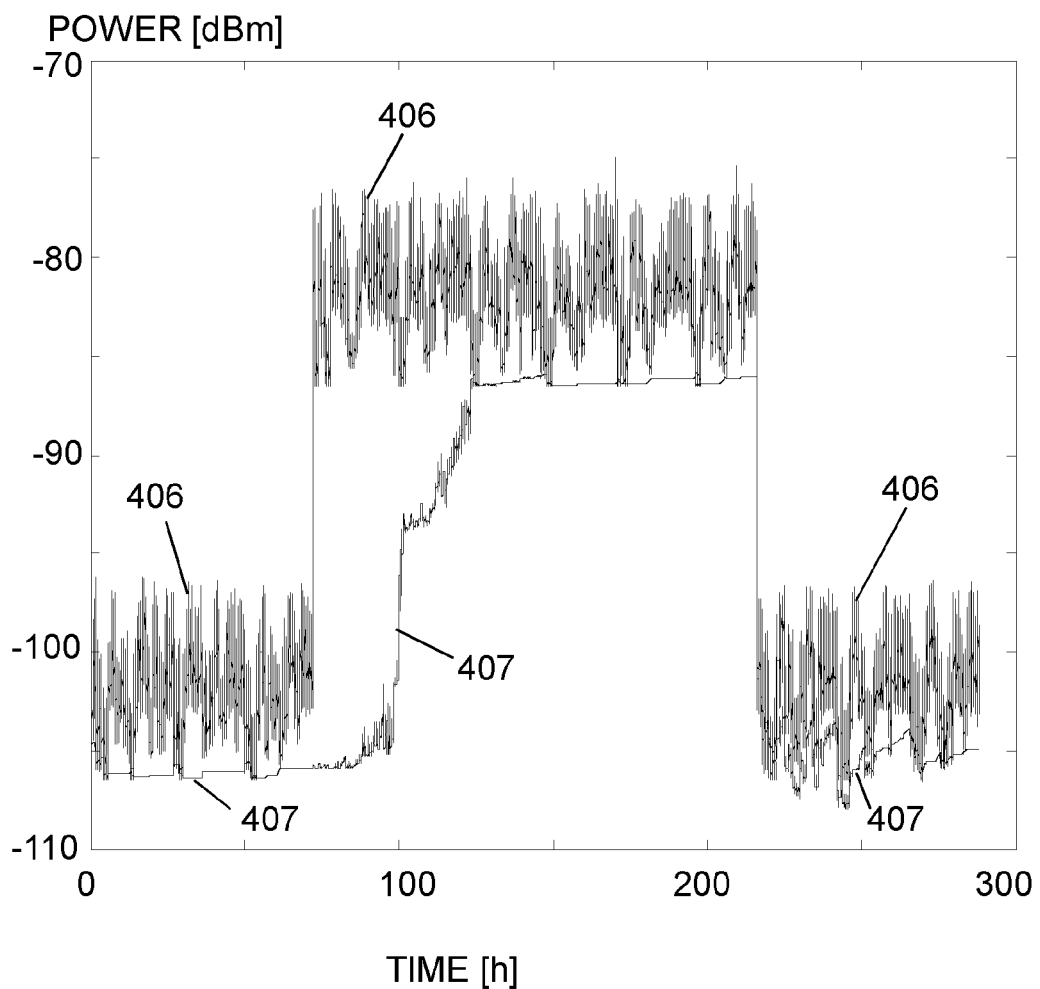
FIG. 10 illustrates the performance of a simulation of an embodiment of the recursive thermal noise power floor estimation algorithm when a high power external interferer is turned on and off.
Figure 11:
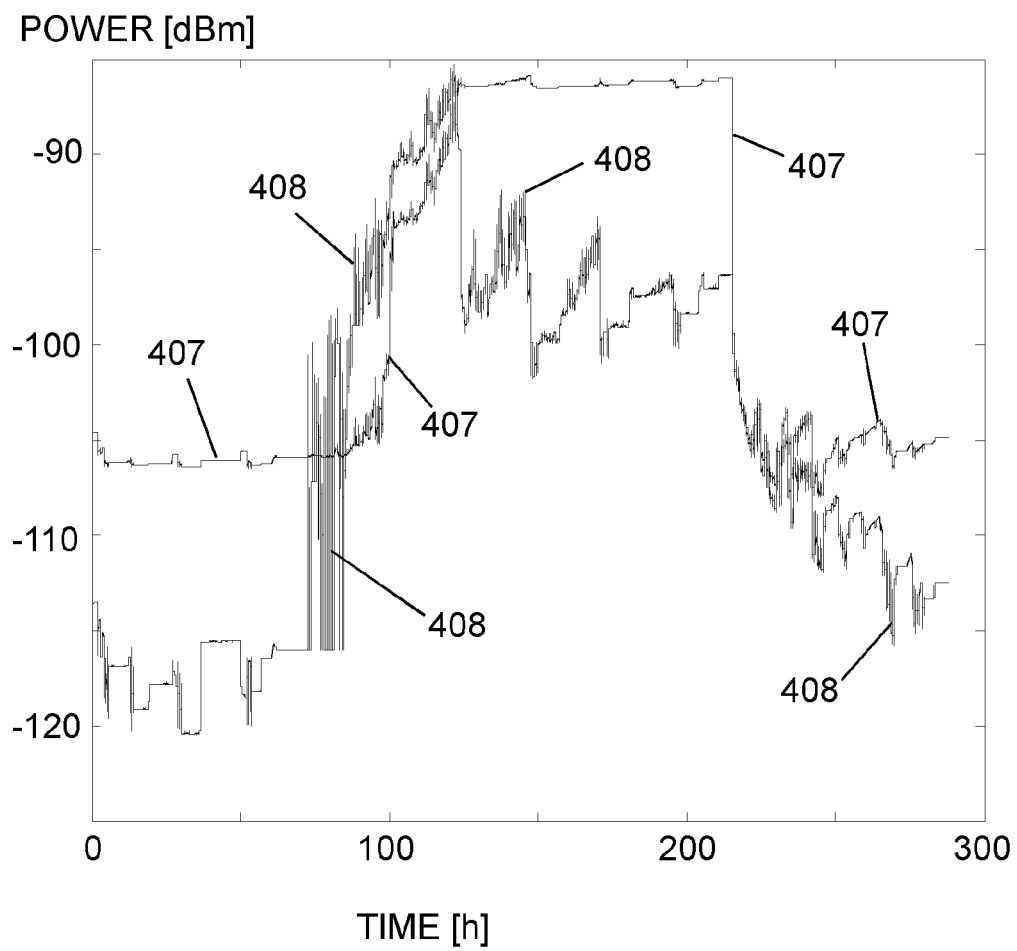
FIG. 11 illustrates the performance of a simulation of an embodiment of the recursive thermal noise power floor estimation algorithm when a high power external interferer is turned on and off.

As can be seen in FIG. 10 and FIG. 11, the thermal noise power floor estimator performs as intended and responds to the external interference after about one day. Curve 406 is the estimated RTWP, curve 407 is the compensated noise floor and curve 408 is the estimated noise floor standard deviation for a simulation run. An increase in noise floor appears at about 70 hours, and the noise floor re-adapts to the correct new level. When the interferer is turned off, the noise floor estimate immediately falls to the old level. This is also as designed since otherwise the throughput would become turned off in the cell. The long response time with respect to a step increase of the external interference is a necessity to avoid a noise floor rise due to heavy traffic during normal operation. The algorithm hence performs as desired.

Figure 12:
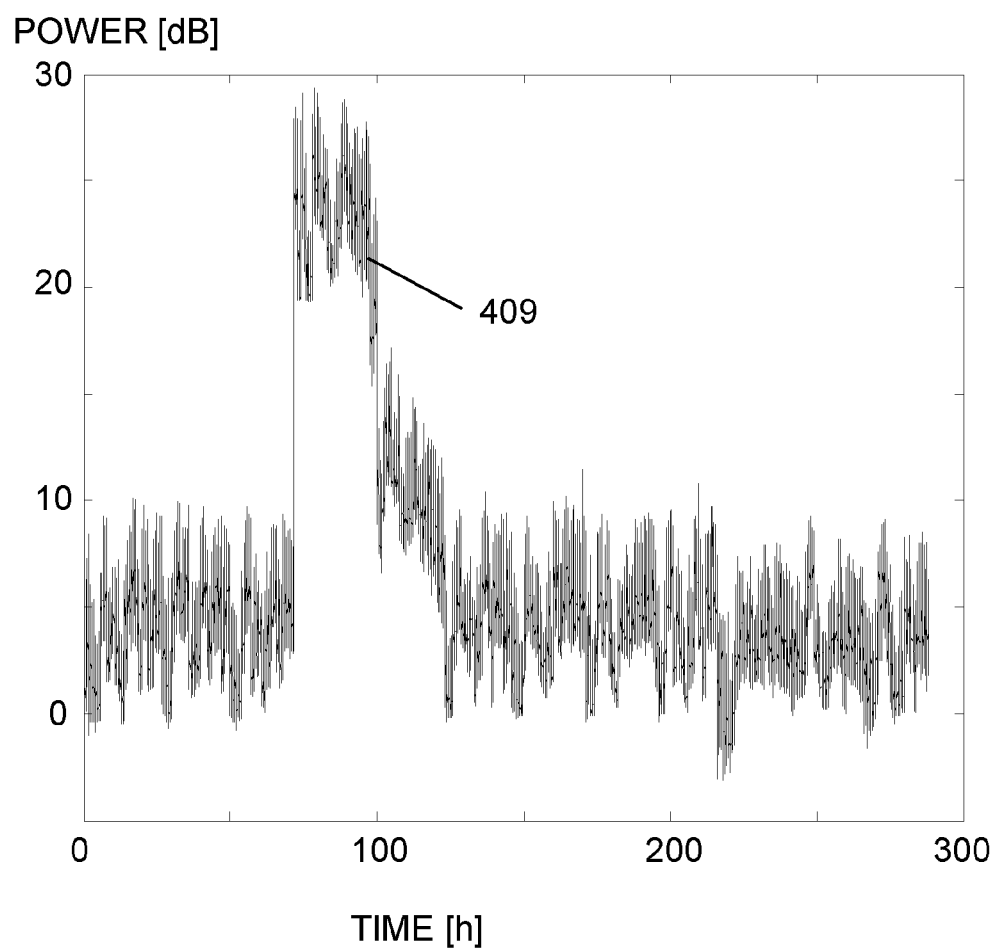
FIG. 12 illustrates the estimated RoT in the simulation of FIG. 11.
Figure 13:
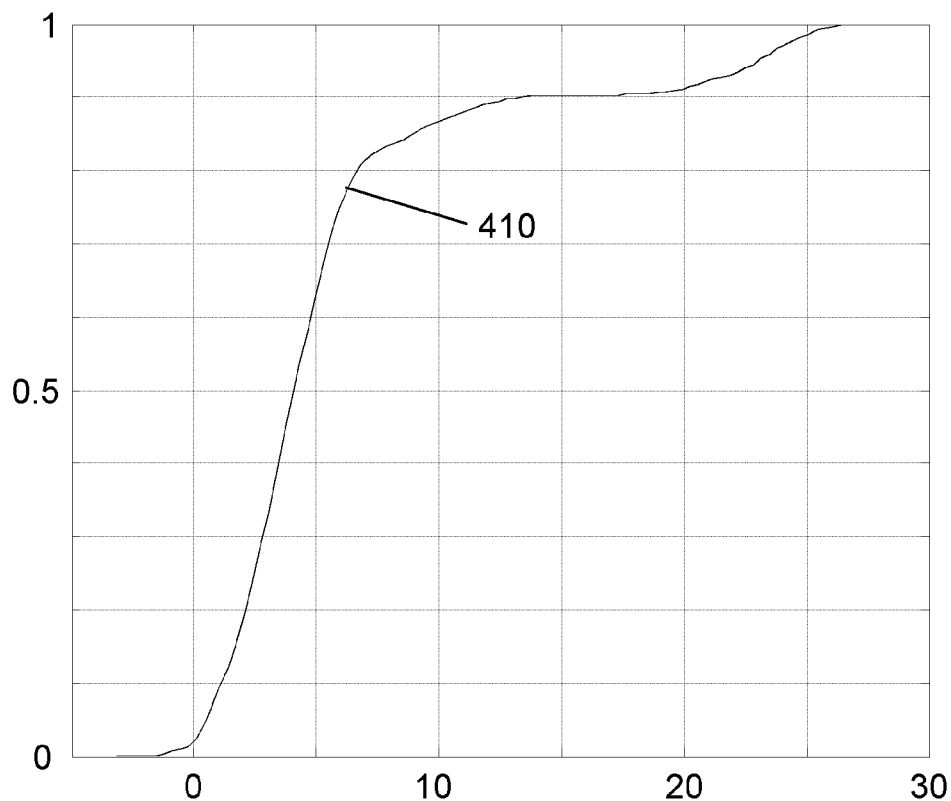
FIG. 13 illustrates the Cumulative Density Function CDF of the estimated RoT in the simulation of FIG. 11.

FIG. 12 and FIG. 13 illustrate the estimated RoT as curve 409 and the CDF of the RoT as curve 410. It is interesting to note that the estimated standard deviation of the thermal noise power floor estimate responds quickly at the time of the step and it may be used to further enhance the performance in this situation. It may also be used to trigger alarms and for other monitoring purposes.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] T. Wigren and P. Hellqvist, "Estimation of uplink WCDMA load in a single RBS", Proc. IEEE VTC-2007 Fall, Baltimore, Md., USA, Oct. 1-3, 2007.

[2] T. Wigren, "Soft uplink load estimation in WCDMA", IEEE Trans Veh. Tech., March, 2009.

[3] T. Wigren, "Recursive noise floor estimation in WCDMA", IEEE Trans. Veh. Tech., vol. 59, no. 5, pp. 2615-2620, 2010.

[4] T. Wigren, "Methods and arrangements for noise rise estimation", Published International Patent Application, WO 2007/024166.

[5] T. Wigren, "Complexity reduction in power estimation", U.S. Pat. No. 7,912,461.

APPENDIX A

Load Estimation without Neighbor Cell Interference Estimation

This section describes the measurement and estimation techniques to measure the instantaneous total load on the uplink air interface.

It is shown in prior art that the load at the antenna connector is given by the noise rise, or rise over thermal, RoT(t), defined by:

$$RoT(t) = \frac{P_{RTWP}(t)}{P_N(t)T}, \quad (A1)$$

where $P_N(t)$ is the thermal noise level as measured at the antenna connector. It remains to define what is meant with $P_{RTWP}(t)$. This relative measure is unaffected of any despreading applied. The definition used here is simply the total wideband power:

$$P_{RTWP}(t) = \sum_{i=1}^{I} P_k(t) + P_{neighbor}(t) + P_N(t), \quad (A2)$$

also measured at the antenna connector. Here $P_{neighbor}$ denotes the power as received from neighbor cells of the WCDMA system, while $P_i(t)$ denotes the power of user i in the own cell. As will be seen below, the major difficulty of any RoT estimation algorithm is to separate the thermal noise power from the interference from neighbor cells.

Another specific problem that needs to be addressed is that the signal reference points are, by definition at the antenna connectors. The measurements are however obtained after the analogue signal conditioning chain, in the digital receiver. The analogue signal conditioning chain does introduce a scale factor error of about 1 dB (1-sigma) that is difficult to compensate for. Fortunately, all powers of (A2) are equally affected by the scale factor error so when (A1) is calculated, the scale factor error is cancelled as:

$$RoT^{DigitalReceiver}(t) = \quad (A3)$$

$$\frac{P_{RTWP}^{DigitalReceiver}(t)}{P_N^{DigitalReceiver}(t)} = \frac{\gamma(t)P_{RTWP}^{Antenna}(t)}{\gamma(t)P_N^{Antenna}(t)} = RoT^{Antenna}(t).$$

In order to understand the fundamental problem of neighbor cell interference when performing load estimation, note that:

$$P_{neighbor}(t)+P_N(t)=E[P_{neighbor}(t)]+E[P_N(t)]+ \Delta P_{neighbor}(t)\Delta P_N(t), \quad (A4)$$

where E[ ] denotes mathematical expectation and where Δ denotes the variation around the mean. The fundamental problem can now be clearly seen. Since there are no measurements available in the RBS that are related to the neighbor cell interference, a linear filtering operation can at best estimate the sum $E[P_{neighbor}(t)]+E[P_N(t)]$, cf. [1]. This estimate cannot be used to deduce the value of $E[P_N(t)]$. The situation is the same as when the sum of two numbers is available. Then there is no way to figure out the values of the individual numbers. This issue is analyzed rigorously for the RoT estimation problem in [2] where it is proved that the noise power floor is not mathematically observable.

Sliding Window Noise Floor Estimation Algorithm

The RoT estimation algorithm currently in use is depicted in FIG. 2. As a summary, received total wideband poer (RTWP) 300 is measured and a Kalman filter 301 provides a filtered RTWP 302. The Kalman filter further provides normal power density functions 303 of the RTWP and provides this to a noise floor estimator 305. The noise floor estimator 305 computes a distribution of a minimum over a sliding window by use of a prior noise floor distribution 304 and provides a noise floor estimate 306. The noise floor estimate 306 and the filtered RTWP 302 are combined in a combiner 307 to a rise over thermal (RoT) value 308. This is described in detail in [1]. The algorithm estimates the RoT, as given by (A1). The main problem solved by the estimation algorithm is the accurate estimation of the thermal noise floor N(t). Since it is not possible to obtain exact estimates of this quantity due to the neighbor cell interference, the estimator therefore applies an approximation, by consideration of the soft minimum as computed over a relative long window in time.

It is important to understand that this estimation relies on the fact that the noise floor is constant over very long periods of time (disregarding the small temperature drift).

Recursive Algorithm

The sliding window algorithm of the above section has the disadvantage of requiring a large amount of storage memory. This becomes particularly troublesome in case a large number of instances of the algorithm are needed, as may be the case when IC is introduced in the uplink.

To reduce the memory consumption a recursive algorithm has been disclosed in a new publicly available patent application. That algorithm reduces the memory requirements of the sliding window scheme discussed above at least by a factor of 100-1000 [3].

The present disclosure is applicable both to the sliding window RoT estimation algorithm and the recursive algorithm.

Load Prediction without Interference Power Estimation

This section describes the techniques, needed to predict the instantaneous load on the uplink air interface ahead in time. This functionality is needed by the scheduler of Enhanced UpLink (EUL). The reason is that the scheduler tests different combinations of grants to determine the best combinations, e.g. maximizing the throughput. This scheduling decision will only affect the air interface load after a number of transmission time intervals (each such TTI being 2 or 10 ms), due to grant transmission latency and User Equipment (UE) latency before the new grant takes effect over the air interface. Time Division (TD) scheduling is further discussed below.

UpLink Load Prediction, Signal-to-Interference Ratio (SIR) Based

The prediction of uplink load, for a tentative scheduled set of users and grants, is based on the power relation:

$$P_{RTWP}(t) - P_N(t) = \sum_{i=1}^{N} L_i(t)P_{RTWP}(t) + P_{neighbor}(t), \quad (A5)$$

where $L_i(t)$ is the load factor of the i:th user of the own cell and where $P_{neighbor}(t)$ denotes the neighbor cell interference. The load factors of the own cell are computed as follows. First it is noted that:

$$(C/I)_i(t) = \frac{P_i(t)}{P_{RTWP}(t) - (1-\alpha)P_i} = \qquad (A6)$$

$$\frac{L_i(t)P_{RTWP}(t)}{P_{RTWP}(t) - (1-\alpha)L_i(t)P_{RTWP}(t)} = \frac{L_i(t)}{1-(1-\alpha)L_i(t)}$$

$$\Leftrightarrow$$

$$L_i(t) = \frac{(C/I)_i(t)}{1 + (1-\alpha)(C/I)_i(t)}, i = 1, \ldots, I,$$

where I is the number of users in the own cell and a is the self-interference factor. The $(C/I)_i(t)$, $i=1, \ldots, I$, are then related to the Signal-to-Interference-and-Noise Ratio (SINR) (measured on the Dedicated Physical Control CHannel (DPCCH)) as follows:

$$(C/I)_i(t) = \qquad (A7)$$

$$\frac{SINR_i(t)}{W_i} \frac{RxLoss}{G} \times \left(1 + \frac{\beta_{DPDCH,i}^2(t) + \beta_{EDPCCH,i}^2(t) + n_{codes,i}(t)\beta_{EDPDCH,i}^2(t) + \beta_{HSDPCCH,i}^2(t)}{\beta_{DPCCH}^2(t)}\right)$$

$$i = 1, \ldots, I.$$

Here $W_i$ is the spreading factor, RxLoss represents missed receiver energy, G is the diversity gain and the β:s are the beta factors of the respective channels, assuming not active channels to have zero beta factors.

The UL load prediction then computes the uplink load of the own cell by a calculation of (A6) and (A7) for each user of the own cell, followed by the summation:

$$L_{own}(t) = \sum_{i=1}^{I} L_i(t), \qquad (A8)$$

which transforms (A5) to:

$$P_{RTWP}(t) = L_{own}(t)P_{RTWP}(t) + P_{neighbor}(t) + P_N(t). \qquad (A9)$$

A division with $P_N(t)$ then shows that the Rise over Thermal (RoT) can be predicted k TTIs ahead as:

$$RoT(t+kT) = \frac{P_{neighbor}(t)/P_N(t)}{1 - L_{own}(t)} + \frac{1}{1 - L_{own}(t)}. \qquad (A10)$$

UpLink Load Prediction, Power Based

The SIR based load factor calculation can be replaced by a power based one, where the basic definition of the load factor:

$$L_i(t) = \frac{P_i(t)}{P_{RTWP}(t)}, \qquad (A11)$$

is used, instead of (A6). The advantage is that the parameter dependence is reduced. On the downside a measurement of the user power is needed. This is the method that is preferred as pre-requisite for the present disclosure.

The invention claimed is:

1. A computer-executed method for neighbor cell interference estimation in an uplink of a code division multiple access communication system, the method comprising:
   obtaining measurements of an uplink received total wideband power;
   obtaining measurements of a load utilization of the uplink;
   determining a thermal noise power estimate based on a long-term average of a plurality of the measurements of the uplink received total wideband power;
   determining a scaling factor based on the thermal noise power estimate; and
   determining a joint estimation of a load utilization state and one or more power-related states based on the measurements of the uplink received total wideband power and the measurements of the load utilization of the uplink;
   wherein each state has an associated error estimate and the joint estimation is determined based on applying the scaling factor to only the power-related states and their associated error estimates.

2. The method of claim 1, wherein said scaling factor is linearly dependent on the thermal noise power estimate.

3. The method of claim 1, wherein said scaling factor is a ratio between the thermal noise power estimate and a nominal value of the average uplink wideband power.

4. The method of claim 1, wherein the long-term average is based on a time constant that is more than 105 times greater than a transmission time interval of the uplink.

5. The method of claim 1, wherein the long-term average is based on a time constant of at least 1 hour.

6. The method of claim 1, wherein said uplink utilizes more than one antenna branch, and wherein said method for neighbor cell interference estimation is performed separately for each antenna branch.

7. The method of claim 1, wherein said uplink utilizes more than one antenna branch, and wherein said method for neighbor cell interference estimation is performed jointly for all antenna branches.

8. The method of claim 1, wherein obtaining measurements of the uplink received total wideband power comprises measuring the uplink received total wideband power.

9. The method of claim 1, wherein each of the measurements of the uplink received total wideband power comprises the sum of an actually measured uplink received total wideband power and an artificial noise floor.

10. The method of claim 1, wherein said obtaining of measurements of a load utilization of the uplink comprises comparing a scheduled own load with a used own load.

11. The method of claim 10, wherein said communication system is a wideband code division multiple access communication system, and wherein said used own load is determined based on decoding a Transport Format Combination Indicator.

12. The method of claim 1, wherein:
   the one or more power-related states includes a sum of a neighbor cell interference power and a noise power floor; and
   the load utilization state comprises one of an own-cell load factor and a load utilization probability.

13. The method of claim 12, wherein the joint estimation is determined by the use of an extended Kalman filter.

14. The method of claim 1, wherein said thermal noise power floor estimate is one of an estimated thermal noise power floor level and an operational level of said received total wideband power.

15. The method of claim 1, further comprising determining a neighbor cell interference estimate based the thermal noise power estimate and at least one of the power-related states.

16. A baseband subsystem in a code division multiple access communication system comprising an input, a processor and a memory comprising executable instructions that, when executed by said processor, configure said baseband subsystem to:
obtain measurements of an uplink received total wideband power;
obtain measurements of a load utilization of the uplink;
determine a thermal noise power estimate based on a long-term average of a plurality of the measurements of the uplink received total wideband power;
determine a scaling factor based on the thermal noise power estimate; and
determine a joint estimation of a load utilization state and one or more power-related states based on the measurements of the uplink received total wideband power and the measurements of the load utilization of the uplink;
wherein each state has an associated error estimate and the joint estimation is determined based on applying the scaling factor to only the power-related states and their associated error estimates.

17. The baseband subsystem of claim 16, wherein said scaling factor is linearly dependent on the thermal noise power estimate.

18. The baseband subsystem of claim 16, further configured to determine said scaling factor as a ratio between the thermal noise power estimate and a nominal value of an average uplink wideband power.

19. The baseband subsystem of claim 16, wherein the long-term average is based on a time constant that is more than 105 times greater than a transmission time interval of the uplink.

20. The baseband subsystem of claim 16, wherein the long-term average is based on a time constant of at least 1 hour.

21. The baseband subsystem of claim 16, wherein said uplink utilizes more than one antenna branch, and wherein the processor and memory are operative to jointly estimate the sum of a neighbor cell interference power and noise power floor, as well as load utilization probability, for each antenna branch.

22. The baseband subsystem of claim 16, wherein said uplink utilizes more than one antenna branch, wherein the processor and memory are operative to jointly estimate the sum of a neighbor cell interference power and noise power floor, as well as load utilization probability, considering all antenna branches jointly.

23. The baseband subsystem of claim 16, wherein each of the measurements of the uplink received total wideband power comprises the sum of an actually measured uplink received total wideband power and an artificial noise floor.

24. The baseband subsystem of claim 16, wherein:
the one or more power-related states includes a sum of a neighbor cell interference power and a noise power floor; and
the load utilization state comprises one of an own-cell load factor and a load utilization probability.

25. The baseband subsystem of claim 24, wherein the joint estimation is determined by an extended Kalman filter.

26. The baseband subsystem of claim 16, wherein said thermal noise power floor estimate is one of an estimated thermal noise power floor level and an operational level of said received total wideband power.

27. The baseband subsystem of claim 16, further configured to determine a neighbor cell interference estimate based the thermal noise power estimate and at least one of the power-related states.

28. A Node B in a code division multiple access communication system comprising the baseband subsystem of claim 16.

29. The Node B of claim 28, further comprising a power meter, connected to said baseband subsystem, and operable to measure the uplink received total wideband power and to provide said measurements of said uplink received total wideband power to the baseband subsystem.

30. The Node B of claim 28, further comprising a load utilization meter, connected to said baseband subsystem, operative to provide measurements of a load utilization of said uplink by comparing a scheduled own load with a used own load and to provide said measurements of said load utilization of the uplink to the baseband subsystem.

31. The Node B of claim 30, wherein said communication system is a wideband code division multiple access communication system, said Node B further comprising a scheduler configured to provide the scheduled own load estimate and a Transport Format Combination Indicator decoder configured to provide the used own load estimate.

32. A code division multiple access communication system comprising the Node B according to claim 28.

33. A non-transitory computer-readable medium comprising, stored thereupon, a computer program comprising program code that, when executed by a processing circuitry, causes the processing circuitry to estimate neighbor cell interference in an uplink of a code division multiple access communication system by:
obtaining measurements of an uplink received total wideband power;
obtaining measurements of a load utilization of the uplink;
determining a thermal noise power estimate based on a long-term average of a plurality of the measurements of the uplink received total wideband power;
determining a scaling factor based on the thermal noise power estimate; and
determining a joint estimation of a load utilization state and one or more power-related states based on the measurements of the uplink received total wideband power and the measurements of the load utilization of the uplink;
wherein each state has an associated error estimate and the joint estimation is determined based on applying the scaling factor to only the power-related states and their associated error estimates.

* * * * *